US006801251B1

(12) United States Patent
Kawaoka et al.

(10) Patent No.: US 6,801,251 B1
(45) Date of Patent: Oct. 5, 2004

(54) DIGITAL CAMERA, AND IMAGE SYNTHESIZER AND METHOD OF CONTROLLING THE SAME

(75) Inventors: Yoshiki Kawaoka, Asaka (JP); Kaname Nihei, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/442,245

(22) Filed: Nov. 17, 1999

(30) Foreign Application Priority Data

Nov. 18, 1998 (JP) .......................................... 10-327912

(51) Int. Cl.[7] .............................................. H04N 5/76
(52) U.S. Cl. .................................................. 348/231.3
(58) Field of Search ................................ 348/231, 232, 348/233, 333.02, 231.3, 231.5; 340/933

(56) References Cited

U.S. PATENT DOCUMENTS

| | | | | |
|---|---|---|---|---|
| 5,267,042 A | * | 11/1993 | Tsuchiya et al. | 348/232 |
| 5,477,264 A | * | 12/1995 | Sarbadhikari et al. | 348/231 |
| 5,591,972 A | * | 1/1997 | Noble et al. | 340/933 |
| 5,633,678 A | * | 5/1997 | Parulski et al. | 348/231.3 |
| 5,948,038 A | * | 9/1999 | Daly et al. | 340/933 |
| 6,278,486 B1 | * | 8/2001 | Hieda et al. | 348/232 |
| 6,282,362 B1 | * | 8/2001 | Murphy et al. | 386/46 |
| 6,321,026 B1 | * | 11/2001 | Dierke | 348/232 |
| 6,337,951 B1 | * | 1/2002 | Nakamura | 348/232 |

* cited by examiner

*Primary Examiner*—Wendy R. Garber
*Assistant Examiner*—Rashawn N Tillery
(74) *Attorney, Agent, or Firm*—Sughrue Mion, PLLC

(57) ABSTRACT

The present invention is directed to identifying photographs to be handed to attendants at a wedding reception, for example. In front of a seat in which the attendant at the wedding reception sits, an Ir light emitting device which transmits a seat code for identifying the attendant is placed. The seat code is received, to record data representing the seat code, and the attendant is photographed, to record image data representing an image of the attendant in correlation with the seat code on a memory card of a digital camera. An attendant file including the seat code and the name of the attendant is previously created. The image of the attendant which is obtained by the photographing, the name of the attendant and so forth are related to each other using the seat code. A print is obtained from a composite image in which the image of the attendant and the name of the attendant is synthesized with a template image. The attendant to which the print is to be handed can be confirmed by seeing the name.

9 Claims, 26 Drawing Sheets

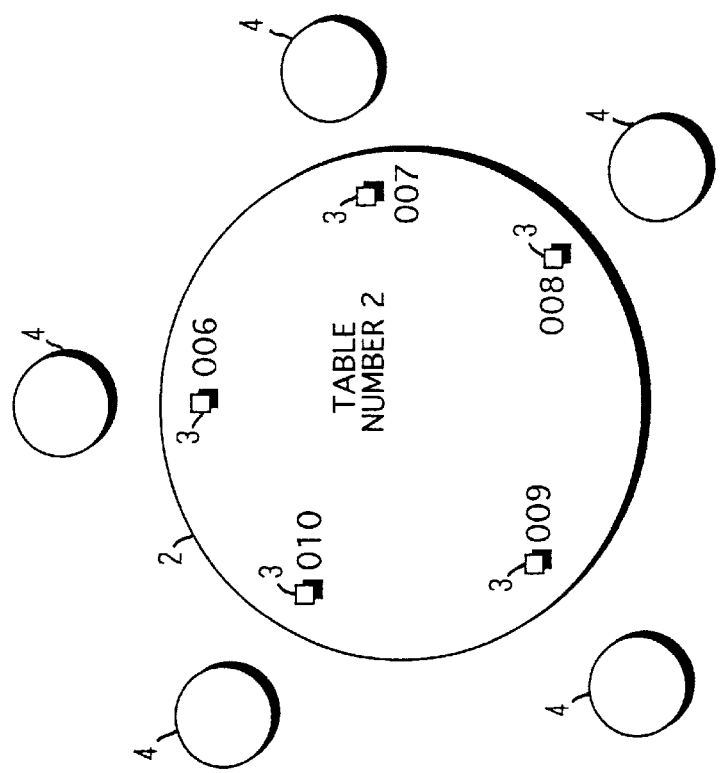
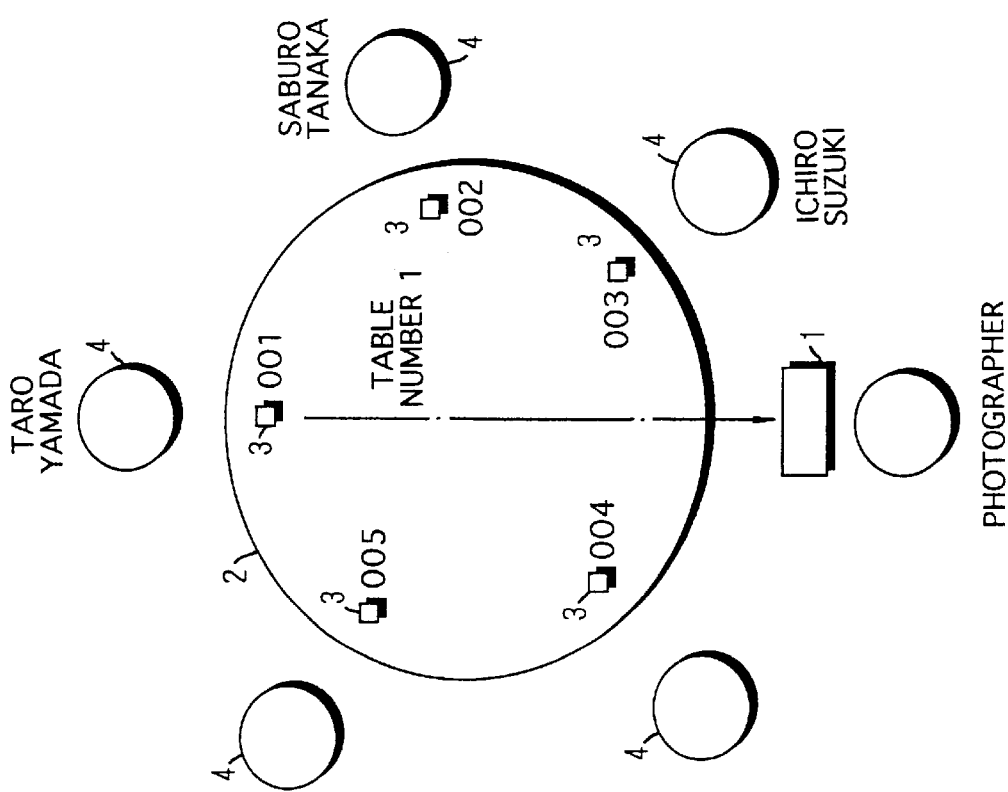
Fig. 1

*Fig. 4*

ATTENDANT FILE (SUBJECT IDENTIFICATION FILE)

| SEAT CODE | NAME | NAME OF WEDDING RECEPTION HALL | NAMES OF BRIDE AND BRIDEGROOM | DATE | MESSAGE |
|---|---|---|---|---|---|
| 001 | TARO YAMADA | FUJI FILM HALL | ICHIRO, HANAKO FUJI | 1998. 6.1 | WE WILL HELP EACH OTHER TO LIVE A HAPPY HOME LIFE. |
| 002 | SABURO TANAKA | FUJI FILM HALL | ICHIRO, HANAKO FUJI | 1998. 6.1 | OUR FAMILY WOULD LIKE TO HAVE FRIENDLY RELATIONS WITH YOURS. |
| 003 | ICHIRO SUZUKI | FUJI FILM HALL | ICHIRO, HANAKO FUJI | 1998. 6.1 | PLEASE COME AND SEE US. |
| ..... | ..... | ..... | ..... | ..... | ..... |

*Fig. 22*

```
NUMBER OF PHOTOGRAPHS
      TO BE TAKEN
                                              ⁄A11
SET TABLE NUMBER                      *** NUMBER    "←" KEY
SET NUMBER OF PHOTOGRAPHS TO BE TAKEN *** NUMBER    "→" KEY
                                          SET ↑ : "DETERMINATION" KEY
SET PRINT                                 A12

TABLE NUMBER        NUMBER OF PHOTOGRAPHS
                         TO BE TAKEN
      001                    005              RETRIEVE : "↑" KEY
      002  ⁄A13              005  ⁄A14
      003                    006
      004                    006
      005                    005              RETRIEVE : "↓" KEY
```

*Fig. 23*

| TABLE NUMBER | NUMBER OF PHOTOGRAPHS TO BE TAKEN | REMAINING NUMBER OF PHOTOGRAPHS TO BE TAKEN |
|---|---|---|
| 001 | 005 | 001 |
| 002 | 005 | 003 |
| 003 | 006 | 000 |
| 004 | 006 | 000 |
| 005 | 005 | 001 |
| 006 | 004 | 004 |
| 007 | 007 | 000 |
| 008 | 006 | 000 |
| 009 | 006 | 001 |
| 010 | 005 | 000 |

*Fig. 25*

| NUMBER - OF - PRINT SETTING ,161 | | | TABLE NUMBER |
|---|---|---|---|
| t1<br>001<br>001 | t2<br>*002*<br>*003* | t3<br>002<br>001 | NUMBER OF PRINT<br><br>DESIGNATE IMAGE<br>: "1"~"9" KEY |
| t4<br>003<br>001 | t5<br>003<br>001 | t6<br>003<br>001 | DESIGNATE FIGURE<br>: "←" KEY<br>: "→" KEY |
| t7<br>003<br>001 | t8<br>003<br>001 | t9<br>007<br>001 | SET: "DETERMINATION" KEY |

TURN TO PREVIOUS PAGE: "↑" KEY / TURN TO NEXT PAGE: "↓"KEY

*Fig. 26*

| | | | |
|---|---|---|---|
| PRINTING CONDITION CONFIRMATION | | | NOW PRINTING |
| ⟋A31 | | A32 ↓ | |
| NUMBER OF ALL PRINTS TO BE MADE : 84 | | NUMBER OF ALL PRINTS WHICH HAVE BEEN MADE : 20 | |
| TABLE NUMBER | NUMBER OF PRINTS TO BE MADE | NUMBER OF PRINTS WHICH HAVE BEEN MADE | |
| 001 | 005 | 005 | RETRIEVE : "↑" |
| 002 | 003 | 003 | |
| 003 | 006 | 006 | RETRIEVE : "↓" |
| 004 | 006 | 006 | |
| ⟋005 | 005 ⟍A33 | 000 ⟍A34 | |
| A32    : | : | : | |

DIGITAL CAMERA, AND IMAGE SYNTHESIZER AND METHOD OF CONTROLLING THE SAME

BACKGROUND OF THE INVENTION

1. Field of the Invention

The present invention relates to an image synthesizer and an image synthesizing method, a digital camera and a method of controlling the operation of the digital camera, and a printer controller and a method of operating the printer controller.

2. Description of the Background Art

When photographs of a lot of attendants at a wedding ceremony or a wedding reception, for example, are taken with a camera, and the photographs are distributed to the attendants, a person in each of the photographs is confirmed by seeing the photograph. The photograph is handed to the attendant which is the confirmed person.

In this case, if the person in the photograph is not known, the photograph cannot be handed to the attendant. When a lot of subjects are photographed, a photographer may forget to photograph some of the subjects.

SUMMARY OF THE INVENTION

An object of the present invention is to make it possible to confirm a person to whom a photograph obtained by photographing a subject is to be handed.

Another object of the present invention is to make it possible to remember to photograph all subjects.

An image synthesizer according to the first invention comprises a first reading device for reading, from an image file storing image data of a plurality of frames respectively representing subject images which are obtained by photographing the subjects in correlation with identification codes respectively specifying the plurality of subjects, the image data and the identification codes, a second reading device for reading, from a subject identification file storing subject identification information including the identification codes for the plurality of subjects, the subject identification information, and an output device for synthesizing to output the image data and the subject identification information which are related to each other by the identification code, among the image data obtained by the first reading device and the subject identification information obtained by the second reading device.

An image synthesizing method according to the first invention comprising the steps of inputting, from an image file storing image data of a plurality of frames respectively representing subject images which are obtained by photographing the subjects in correlation with identification codes respectively specifying the plurality of subjects, the image data and the identification codes, inputting, from a subject identification file storing subject identification information including the identification codes for the plurality of subjects, the subject identification information, and synthesizing to output the image data and the subject identification information which are related to each other by the identification code, among the inputted image data and the inputted subject identification information.

The image file storing the image data and the identification code in correlation with each other is generally obtained from a digital camera. Such digital camera will be explained later. The first reading device may be implemented by a reading device for an image recording medium (e.g., a memory card) of the digital camera.

The subject identification file holding the subject identification information may be provided on a recording medium in a personal computer such as a hard disc, a floppy disc or the like. The image synthesizer may be the personal computer. Accordingly, the second reading device may be realized by a HD drive, a FD drive or the like.

In one embodiment, the output device outputs a signal representing the image data and a signal representing the subject identification information. When these signals are fed to a printer, a print (photograph) of a subject on which the subject identification information appears can be obtained.

In another embodiment, the output device performs image synthesis of the image data representing the subject and image data representing the subject identification information to output. The composite image data produced by the images synthesis is fed to a printer. A print of the composite image having the subject identification information expressed thereon can be obtained.

According to still another embodiment, the output device synthesizes the subject image represented by the image data and the subject identification information with a template image to output. A print of the composite image of the subject on which the subject identification information appears is obtained by a printer using the synthesized composite image data.

Preferably, the output device includes a printer printing the synthesized composite image.

In accordance with a desirable embodiment, the image synthesizer further comprises an input device (inclusive of a FD drive, a HD drive or the like) for inputting template image data representing a template image in which a plurality of synthesis areas are defined. The output device synthesizes the image data and data representing the subject identification information with the template image data fetched by the input device such that the subject image and the subject identification information are placed in the synthesis areas. When the synthesized composite image is fed to a printer, a print (photograph) including the subject identification information and the subject image synthesized with the template image appearing thereon can be obtained.

A print obtained by printing the image is assigned the subject identification information for a person to whom the print is to be handed. Accordingly, the person to whom the print is to be handed is found only by seeing the identification information. Even if a person on the printed image is not known, the person to whom the print is to be handed is found.

If the subject photographed as the subject image is a person, for example, the subject identification information is the name of the person or the destination of distribution of the print.

The subject identification information may include the date on which the subject is photographed, the place where the subject is photographed, and a message, and further various messages corresponding to the person to whom the print is to be handed.

A digital camera according to the second invention comprises an imaging device for photographing an image of a subject, a receiving device for receiving an identification code (inclusive of an input device for the identification code), a first storage device for storing digital image data representing the subject image obtained from the imaging device in correlation with the identification code received by the receiving device. The image file used in the image synthesizer is produced.

In a preferred embodiment, the digital camera further comprises a display device for displaying the identification code received by the receiving device. In a case where the identification code is carried by a medium (e.g., an infrared ray) which is propagated through space, the receiving device or a device emitting the medium preferably has high directivity.

In another embodiment, the digital camera further comprises a second storage device for storing a plurality of items of subject identification information respectively including identification codes. The first storage device compares the identification code received by the receiving device with the identification codes stored in the second storage device and stores the subject identification information which includes the identification code matching with the received identification code and the digital image data obtained from the imaging device in correlation with each other. The image data and the subject identification information stored in the first storage device may be synthesized with each other.

According to still another embodiment, the digital camera further provided with a display device for displaying a part of the subject identification information which includes the identification code matching with the received identification code.

In accordance with a desirable embodiment, the digital camera further comprises a device for performing image synthesis of the digital image data and the data representing the subject identification information which are stored in the first storage device in mutually correlated manner.

More preferably, the digital camera is provided with a printer for printing the composite image produced by the image synthesis device. A print of the composite image including the subject identification information is obtained through the digital camera.

A digital camera according to the third invention is characterized by comprising number-of-photographs-to-betaken file input device for inputting a file in which the number of photographs to be taken is previously determined for each category, first report control device for reporting for each category the number of photographs to be taken, recording control device for recording image data representing an image of the subject obtained by photographing the subject for each category on a recording medium, decrement means for decrementing the number of photographs to be taken for the corresponding category in response to the recording of the image data on the recording medium by the recording control device, and second report control device for reporting for each category the number of photographs to be taken after the decrement by the decrement means.

The third invention also provides a method of controlling the digital camera. That is, the method comprises the steps of inputting a file in which the number of photographs to be taken is previously determined for each category, reporting for each category the number of photographs to be taken, photographing a subject in accordance with the category and recording image data representing an image of the subject on a recording device, decrementing the number of photographs to be taken for the corresponding category in response to the recording of the image data on the recording medium, and reporting for each category the number of photographs to be taken after the decrement.

According to the third invention, the number of photographs to be taken is displayed for each category. A photographer photographs for each category subjects whose number corresponds to the displayed number of photographs to be taken. When the subjects whose number corresponds to the number of photographs to be taken have been photographed, it is considered that the photographing is terminated without forgetting to photograph any of the subjects. It is possible to prevent the photographer from forgetting to photograph some of the subjects.

A printer controller according to the fourth invention is characterized by comprising an input device for inputting image data obtained by photographing a subject for each category and number data representing the number of photographs which have already been taken or which is to be taken, a number-of-prints setting device for setting for each subject the number of prints to be made from an image of the subject which is represented by the image data obtained by the photographing, calculation means for calculating for each category the number of prints to be made which is set by the number-of-prints setting device, a warning device for providing warning when the number of prints to be made for each category which is calculated by the calculation means is more than the number data, and an output device for outputting data representing the number of prints to be made which is set by the number-of-prints setting device and the corresponding image data when the number of prints to be made for each category which is calculated by the calculation means is not more than the number data.

The fourth invention also provides a method of operating the printer controller. That is, the method comprises the steps of inputting image data obtained by photographing a subject for each category and number data representing the number of photographs which have already been taken or which is to be taken, setting for each subject the number of prints to be made from an image of the subject which is represented by the image data obtained by the photographing, calculating for each category the set number of prints to be made, providing warning when the calculated number of prints to be made for each category is more than the number data, and outputting data representing the set number of prints to be made and the corresponding image data when the calculated number of prints to be made for each category is not more than the number data.

When the subject images are printed, the number of prints to be made is set for each of the subject images. The set number of prints to be made is calculated for each category.

When the calculated number of prints to be made for each category is more than the number of photographs to be taken or having been taken, the number of prints to be made is more than the number of prints to be distributed. The prints remain in excess, so that warning is provided. When the calculated number of prints to be made for each category is not more than the number of photographs to be taken or having been taken, data representing the set number of prints to be made and the corresponding image data are outputted. The outputted data are fed to a printer, for example, so that the subject image is printed to make prints whose number has been set.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates an arrangement of tables and seats in a wedding reception hall;

FIG. 4 illustrates the contents of the attendant file;

FIG. 22 illustrates an example of a display screen of a monitor display device;

FIG. 23 illustrates an example of a table recorded on a memory card;

FIGS. 25 and 26 illustrate examples of the display screen of the monitor display device.

DESCRIPTION OF THE PREFERRED EMBODIMENTS (1) First Embodiment

A combination of a digital camera and an image synthesizer according to a first embodiment is one so adapted that when a photograph of a subject is taken, the photograph is printed, and the printed photograph is handed to a person which is the subject, the person to whom the photograph is to be handed is not mistaken for another person. In the first embodiment, a photograph of each attendant at a wedding reception is taken, and the photograph is handed to the attendant who appears on the photograph.

An image of the attendant which is obtained by the photographing and the name of the attendant appear on the photograph. By seeing the name of the attendant which appears on the photograph, the photograph is handed to the attendant having the name appearing on the photograph (see FIGS. 9 and 10). The photograph can be handed to a person who appears on the photograph even if the name of the attendant is not recognized by seeing the face image of the attendant appearing on the photograph.

FIG. 1 illustrates a part of a wedding reception hall.

A lot of tables 2 are arranged in the wedding reception hall. Attendants 4 at the wedding reception are sitting around the table 2. At the wedding reception, the table 2 around which the attendants sit and their seats at the table 2 are predetermined.

The seats at which the attendants should sit are previously assigned seat codes (codes inherent in the attendants). Seat codes "001" to "005" are assigned to the table 2 having a table number 1, and seat codes "006" to "010" are assigned to the table 2 having a table number 2. Seats for five persons are predetermined around the table 2 having the table number 1. The seat assigned the seat code "001" is for "Taro Yamada", so that "Taro Yamada" has the code "001". The seat assigned the seat code "002" is for "Saburo Tanaka" (the code of "Saburo Tanaka" is "002"). The seat assigned the seat code "003" is for "Ichiro Suzuki" (the code of "Ichiro Suzuki" is "003"). The attendants who should sit in the other seats around the table 1 having the table number 1 and the seats around the table 2 having the table number 2 are similarly predetermined.

On the table 2, an Ir light emitting device 3 is arranged in front of each of the attendants. The Ir light emitting device 3 outputs an infrared ray representing the seat code continuously or periodically at very short intervals.

A digital camera 1 used at the wedding reception receives the infrared ray outputted from the IR light emitting device 3, to detect the seat code represented by the infrared ray. The detected seat code and image data representing an image of the photographed attendant are related to each other, and are recorded on a memory card loaded on the digital camera 1.

Figure 2:
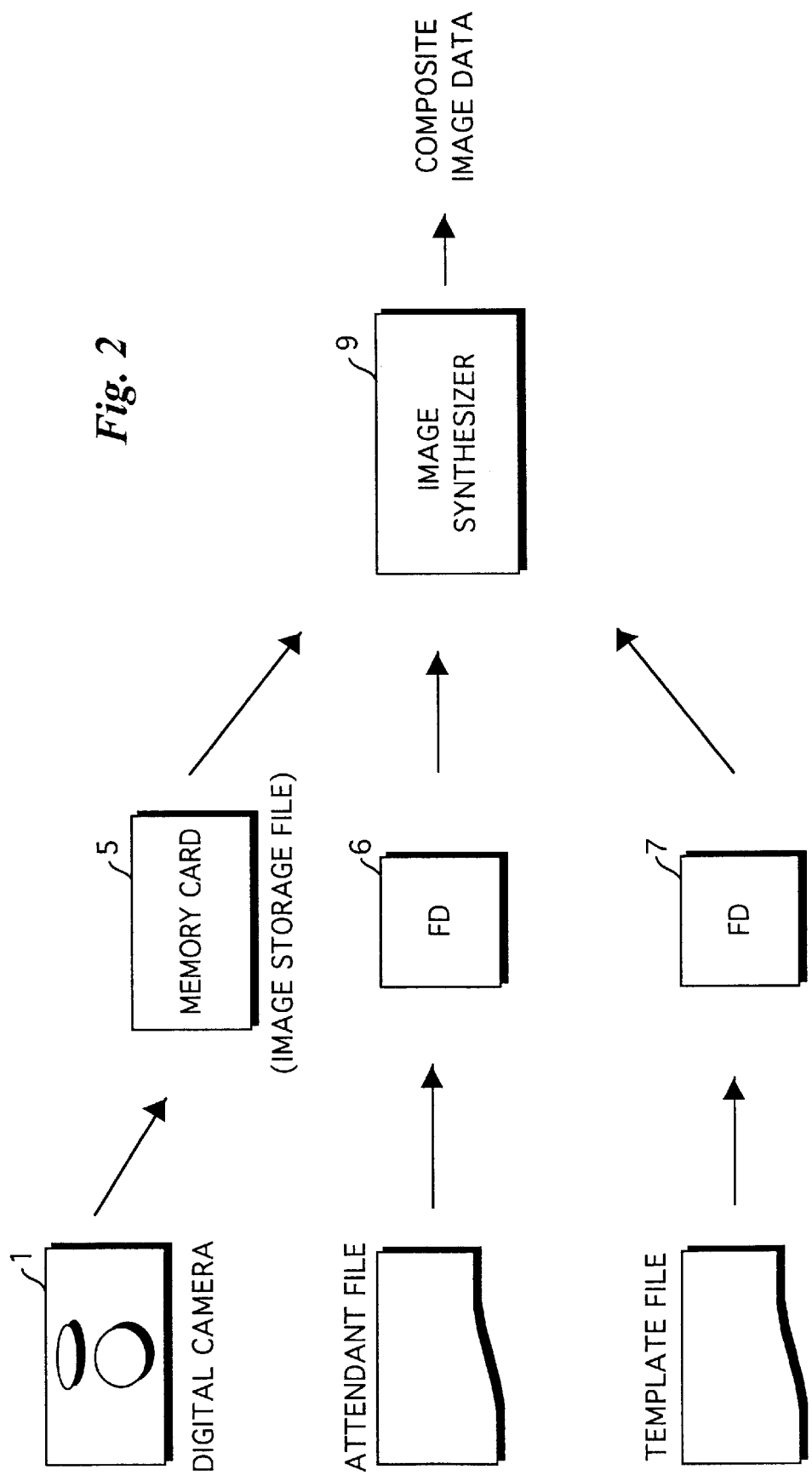
FIG. 2 shows how data is fed to a image synthesizer from an image storage file, an attendant file and a template file.
Figure 3:
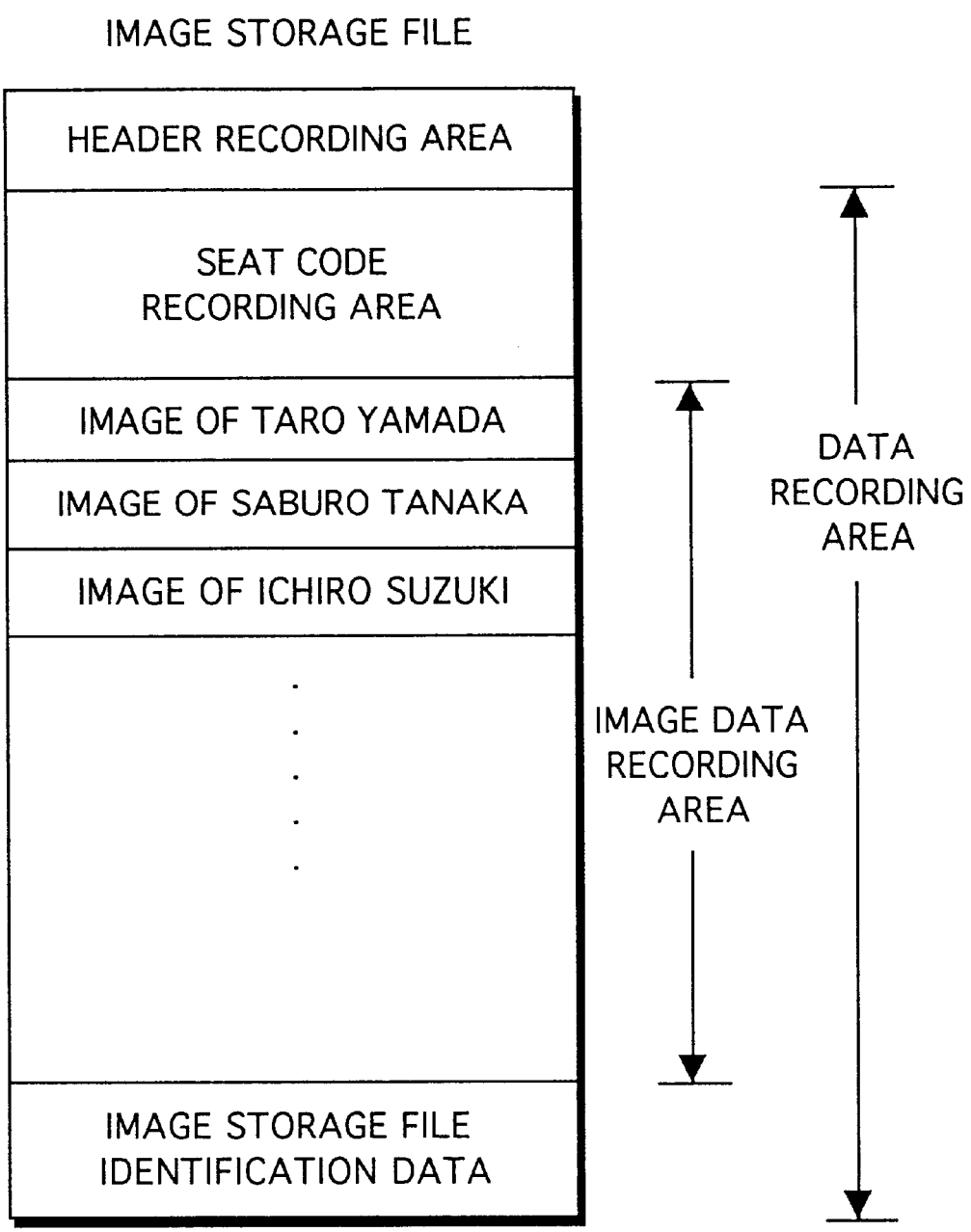
FIG. 3, illustrates the image storage file format.
Figure 5:
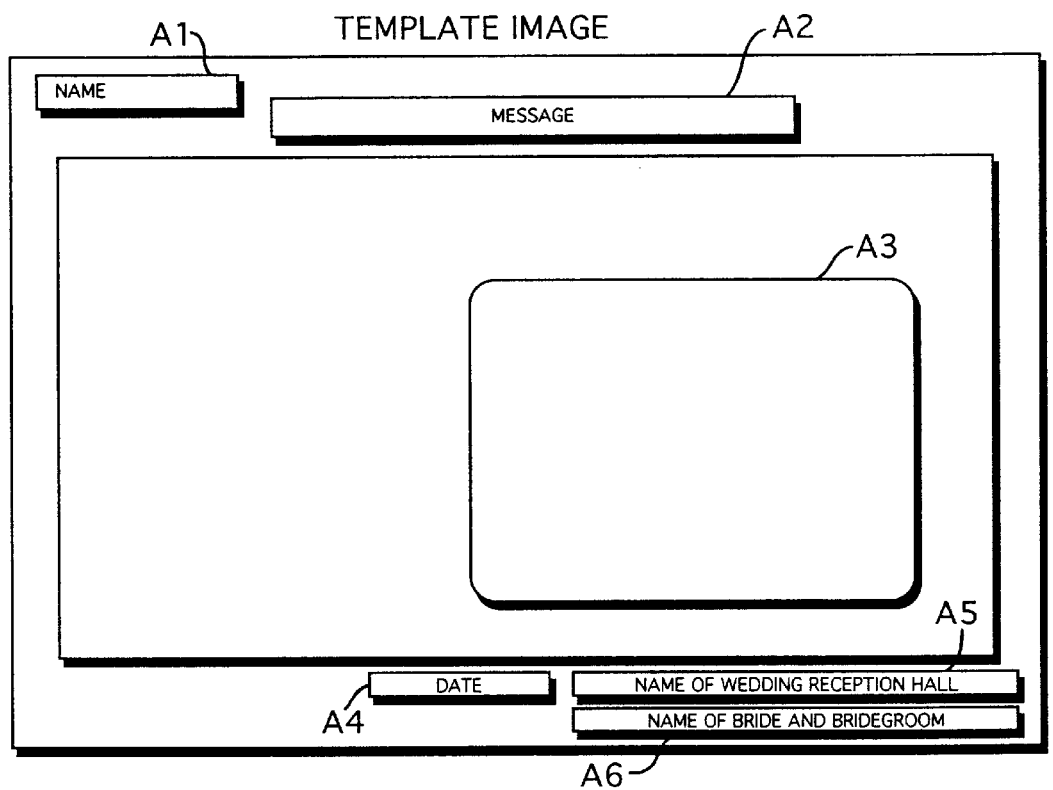
FIG. 5 illustrates an example of a template image format.
Figure 9:
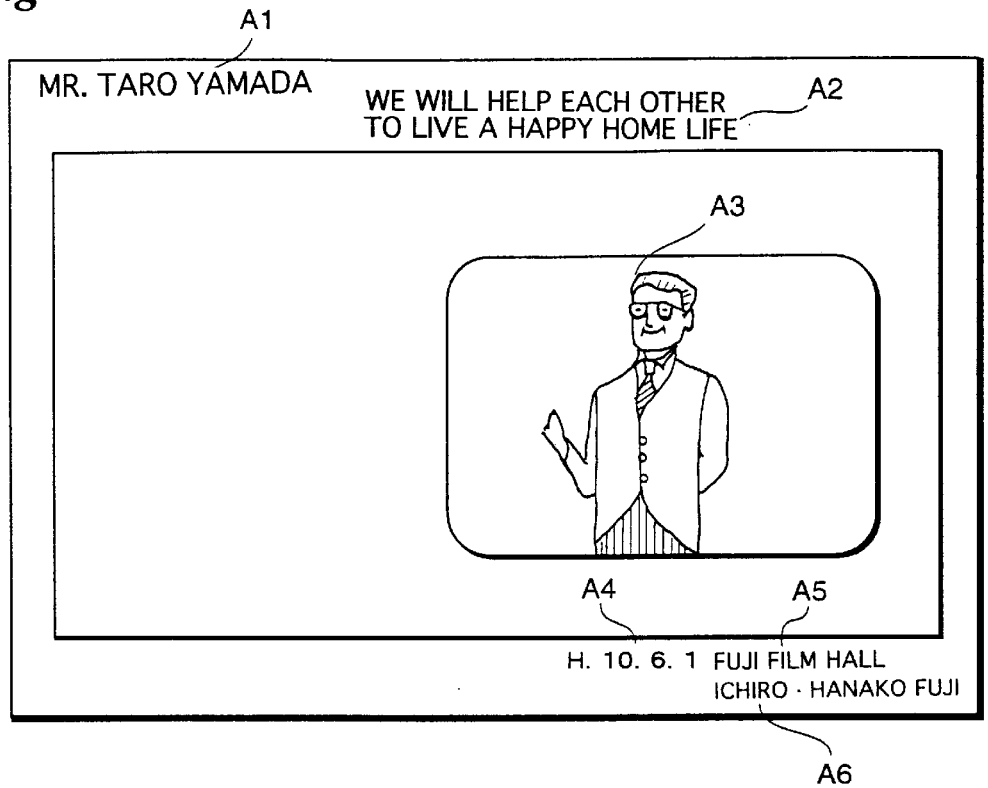
FIGS. 9 and 10 illustrate examples of prints from composite images.
Figure 10:
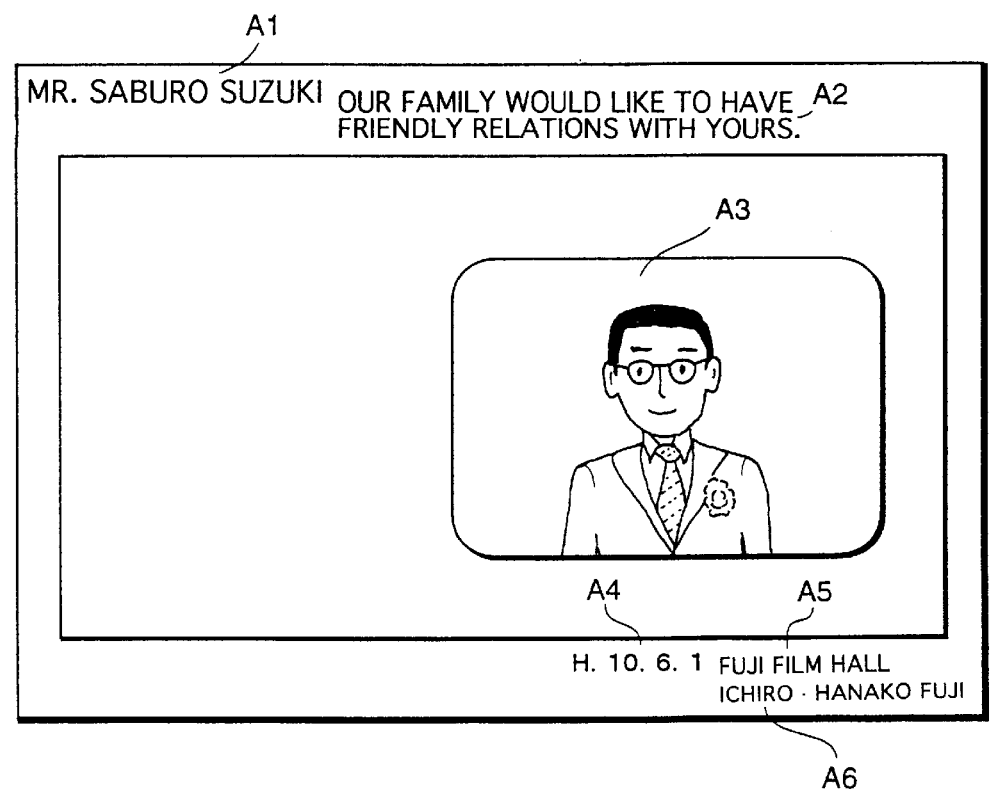

FIG. 2 shows how a composite image as shown in FIG. 9 or 10 is produced on the basis of the image of the attendant photographed with the digital camera 1. FIG. 3 illustrates a format of an image storage file, and FIG. 4 illustrates a format of an attendant file. FIG. 5 illustrates an example of a template image.

In FIG. 3, the image storage file includes a header recording area and a data recording area. The header recording area stores management data for the image storage file. The data recording area includes a seat code recording area and an image data recording area. The seat code recording area stores the seat codes respectively assigned to the attendants at the wedding reception. The image data recording area stores the image data respectively representing the images of the attendants photographed with the digital camera 1 in the form of linking the image data of each image to the seat code in the seat code recording area. The image data representing the images of the attendant who is sitting in the seat which is assigned the seat code can be specified using the seat code. The image storage file is created in a memory card 5 by the digital camera 1.

In FIG. 4, the attendant file (a subject identification file) stores attendant related information for each attendant. The attendant related information included in the attendant file includes a seat code, the name of the attendant, the name of the wedding reception (banquet) hall, the names of the bride and bridegroom, the date, and a message (e.g. the message to the attendant from the bride and bridegroom). The attendant file is provided in an attendant file storage FD 6.

In FIG. 5, defined in the template image are an area A1 where the name included in the attendant related information is synthesized (located or positioned), an area A2 where the message included in the attendant related information is synthesized, an area A3 where the image of the attendant which is obtained by the photographing is synthesized, an area A4 where the date included in the attendant related information is synthesized, an area A5 where the name of the wedding reception hall included in the attendant related information is synthesized, and an area A6 where the names of the bride and bridegroom are synthesized. A template file includes a plurality of items of image data each representing the template image, and is provided in a template file storage FD 7.

As shown in FIG. 2, the memory card 5 storing the image storage file, the attendant file storage FD 6 having the attendant file, and the template file storage FD 7 having the template file are mounted (loaded) on an image synthesizer 9. Items of the attendant related information are synthesized on the areas A1, A2, A4–A6 in the template image, and the image of the attendant having the name included in the attendant related information is synthesized in the area A3 in the template image, to produce composite image data representing a composite image, as described later. Produced composite image data representing the composite image is fed to a printer, so that a photograph of the composite image having the name of the attendant appearing thereon is printed. The attendant file and the template file may be provided on one common FD.

Figure 6:
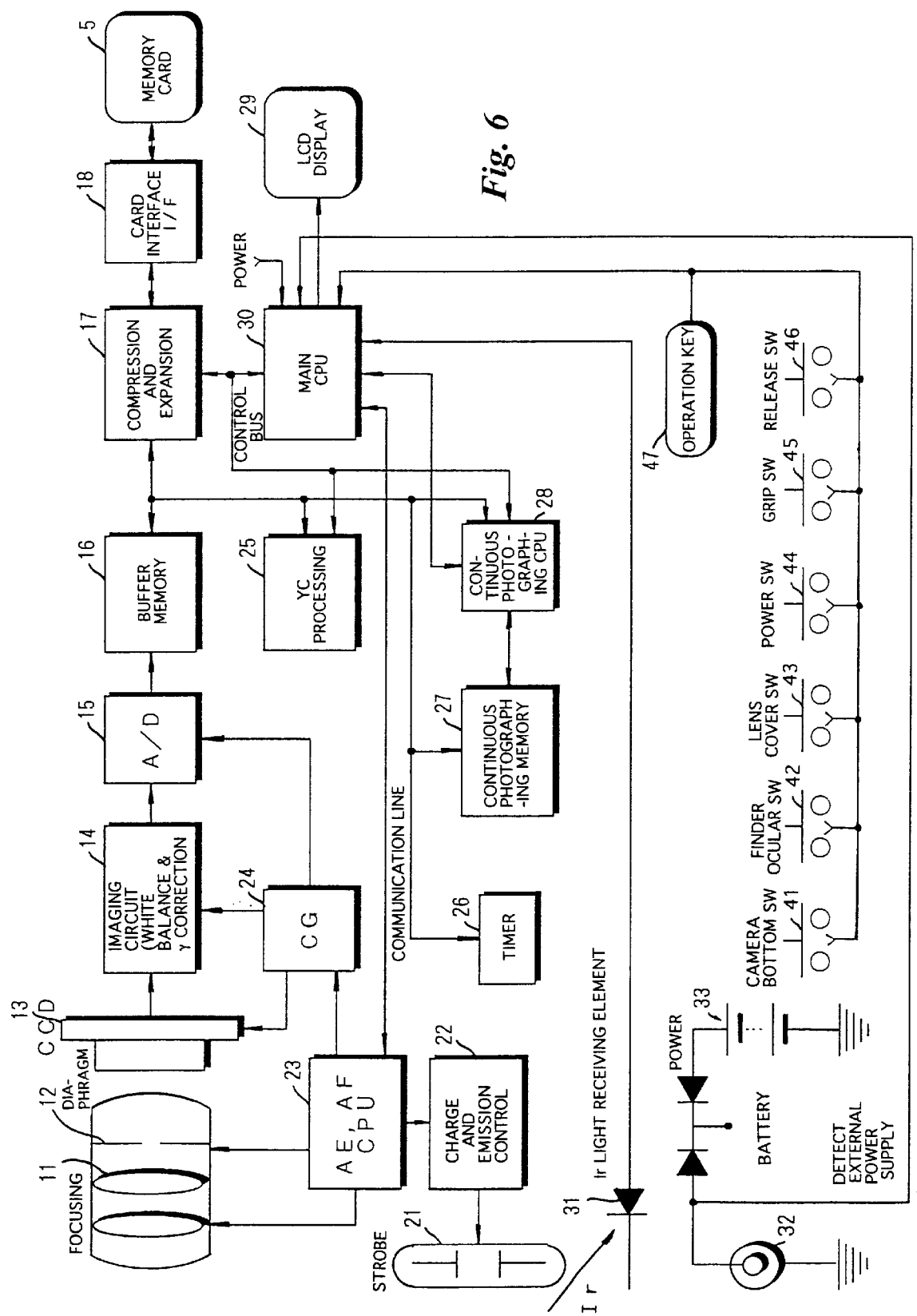
FIG. 6 is a block diagram showing the electrical configuration of a digital camera.

FIG. 6 is a block diagram showing the electrical configuration of the digital camera 1.

The overall operation of the digital camera 1 is supervised by a main CPU 30.

The digital camera 1 includes an Ir light receiving element 31. The Ir light receiving element 31 receives an infrared ray emitted from the Ir light emitting device 3 to output code data represented by the received infrared ray. The code data is inputted to the main CPU 30, so that a seat code is recognized by the main CPU 30. The code data is stored in the seat code recording area of a memory card 5.

The digital camera 1 includes a battery 33, and power is supplied to each of circuits from the battery 33. An external power supply can be connected to the digital camera 1. A terminal 32 for connecting the external power supply is provided.

The digital camera 1 is provided with a camera bottom switch 41 for detecting that the camera 1 is placed, a finder ocular switch 42 for detecting that the eyes of a photographer comes near a finder, a lens cover switch 43 for detecting that a lens cover is mounted, a power switch 44 pushed when the power of the camera 1 is turned on, a grip switch 45 turned on when the photographer gets a grip on the camera 1, and a shutter release switch 46. A detection signal from the switch, a signal representing the pushdown of the switch or the like is inputted to the main CPU 30. The camera 1 comprises various types of operation keys 47 which are used to input a fact that the photographing was continued without one or some attendants or other matters, and a signal representing the set data or other signals inputted by the operation key 47 is inputted to the main CPU 30.

The digital camera 1 includes a strobe device 21 serving as an auxiliary light source. The charge and the emission of the strobe device 21 are controlled by a charge and emission control circuit 22.

A focusing lens 11 and a diaphragm 12 are controlled by an AE (Automatic Exposure) and AF (Automatic Focusing) CPU 23. The quantity of incident light representing a subject image is limited by the diaphragm 12, and the subject image is formed on a light receiving surface of a CCD 13 by the focusing lens 11. An image signal representing the subject image is outputted from the CCD 13, and is inputted to an imaging circuit 14. In the imaging circuit 14, imaging processing such as white balance adjustment, gamma correction and so on of the image signal is performed. The image signal outputted from the imaging circuit 14 is converted into digital image data in an analog-to-digital conversion circuit 15. The digital image data is inputted to a buffer memory 16, and is temporarily stored therein. A clock signal is fed from a clock generator 24 to the CCD 13, the imaging circuit 14 and the analog-to-digital conversion circuit 15. The CCD 13, the imaging circuit 14, and the analog-to-digital conversion circuit 15 are operated on the basis of the clock signal.

The image data temporarily stored in the buffer memory 16 is fed to a YC processing circuit 25, where luminance data Y and color difference data C are produced. The produced luminance data and the produced color difference data C are fed to a compression and expansion circuit 17, where they are subjected to data compression. The luminance data Y and the color difference data C which have been subjected to the data compression are fed to the memory card 5 connected to the compression and expansion circuit 17 through a card interface 18, and are recorded in the image data recording area of the memory card 5 in correlation with the seat code (code data).

The digital camera 1 further includes a liquid crystal display device 29. The luminance data Y and the color difference data C are processed to produce R, G and B image data, which are also fed to the liquid crystal display device 29 through the main CPU 30. The subject image obtained by the imaging is displayed on a display screen of the liquid crystal display device 29.

Furthermore, the digital camera 1 can perform continuous photographing. The digital camera 1 includes a continuous photographing CPU 28 for the continuous photographing. The continuous photographing is controlled by the continuous photographing CPU 28. In the continuous photographing, image data obtained by the continuous photographing are successively stored in a continuous photographing memory 27. When the continuous photographing is terminated, the image data representing to frames which are obtained by the continuous photographing are successively read out of the continuous photographing memory 27, and are recorded on the memory card 5 upon being subjected to YC processing data compression processing, and so forth.

Furthermore, the digital camera 1 comprises a timer 26 for measuring time.

Figure 7:
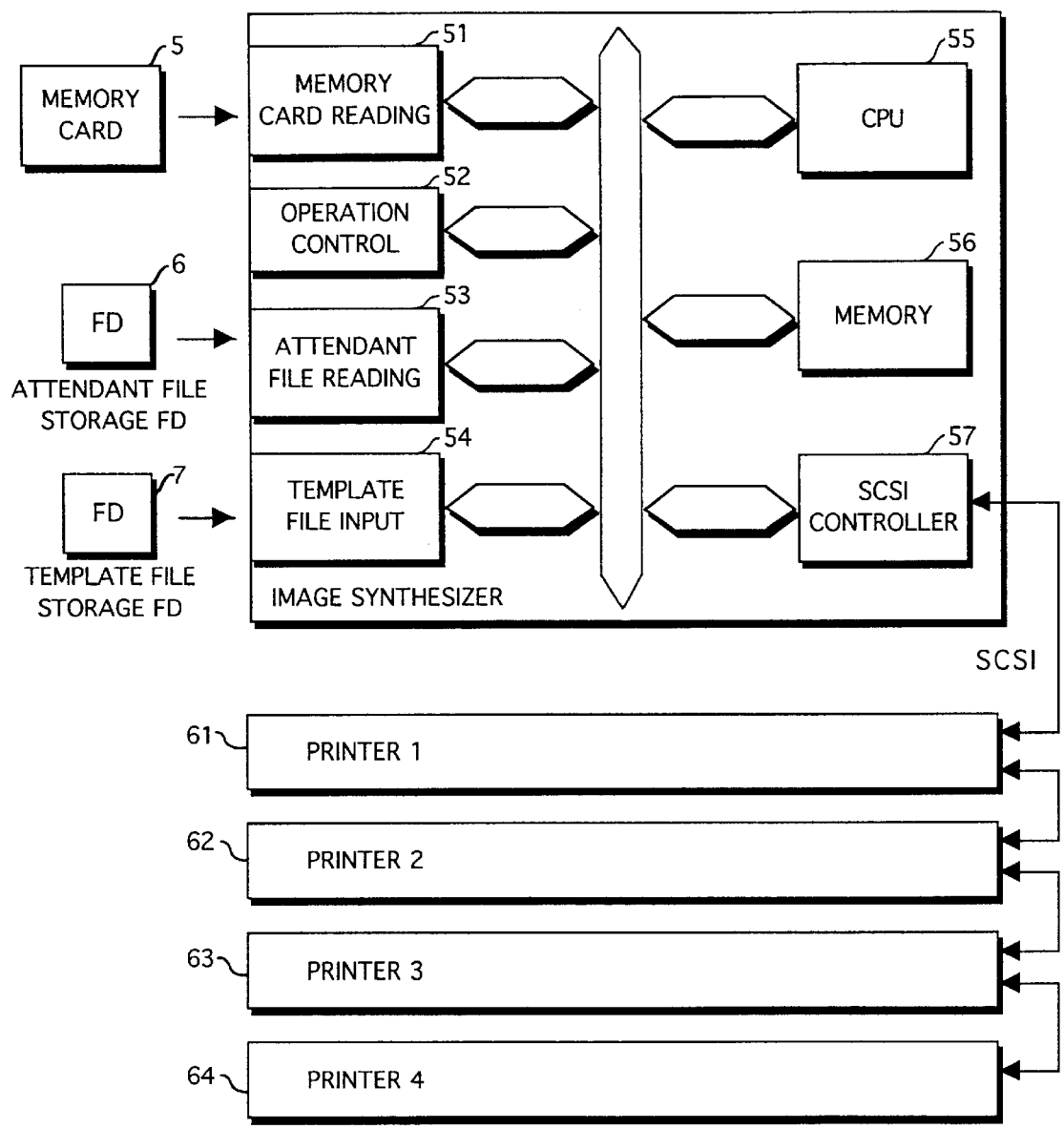
FIG. 7 is a block diagram showing the electrical configuration of an image synthesizer.

FIG. 7 is a block diagram showing the electrical configuration of the image synthesizer 9. The image synthesizer 9 can be realized (implemented) by a personal computer (PC).

The overall operation of the image synthesizer 9 is supervised by a CPU 55.

The image synthesizer 9 includes a memory card reading circuit (a memory card reader) 51 for reading data recorded on the memory card 5, an operation control circuit 52 for inputting an operation command, an attendant file reading circuit (an FD driver) 53 for reading an attendant file stored in the attendant file storage FD 6, and a template file input circuit (an FD driver) 54 for reading a template file stored in the template file storage file FD 7. One FD driver may be provided in a place of the FD drivers 53 and 54 to be commonly used for the FDs 6 and 7.

The image synthesizer 9 includes a memory 56 for temporarily storing data, and an SCSI (Small Computer System Interface) controller 57 for controlling printers 61 to 64 which are connected to the image synthesizer 9.

Figure 8:
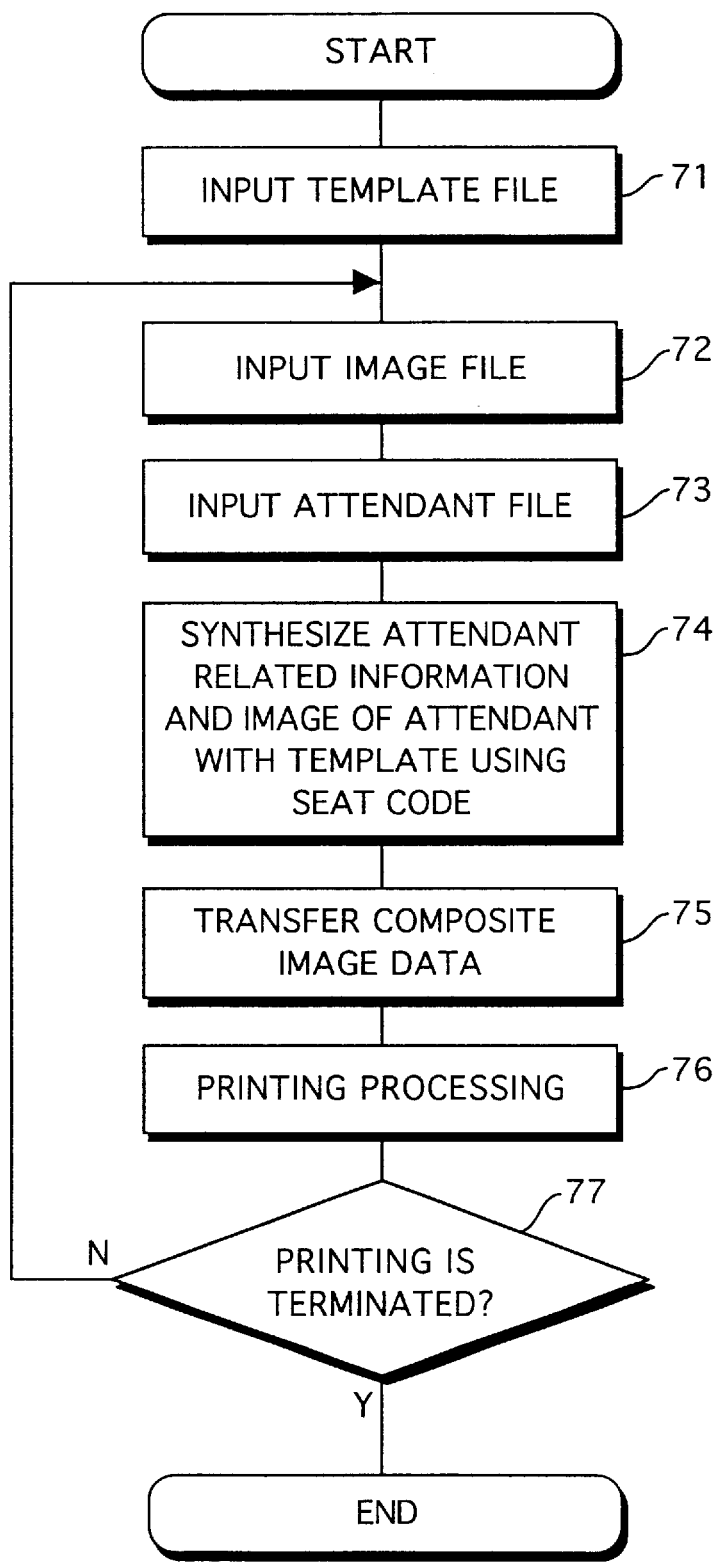
FIG. 8 is a flow chart showing the procedure for image synthesis processing.

FIG. 8 is a flow chart showing the procedure for image synthesis processing by the image synthesizer 9. FIGS. 9 and 10 respectively illustrate examples of a composite image produced using the image synthesizer 9.

Attendants at the wedding reception are photographed using the digital camera 1, as described later. The seat code and the image data representing the image of attendant to whom the seat code is assigned is recorded on the memory card 5 in correlation with each other.

The attendant file is previously created to be stored in the attendant file storage FD 6 by a personal computer, for example.

Furthermore, the template file storage FD 7 storing image data representing a plurality of template images is prepared in advance, with use of a personal computer, for example.

The template file storage FD 7 is first mounted or loaded on the image synthesizer 9. The template file stored in the template file storage FD 7 is inputted by the template file input circuit 54, and is temporarily stored in the memory 56 (step 71). The memory card 5 is mounted on or connected to the memory card reading circuit 51. The image storage file stored in the memory card 5 is inputted by the memory card reading circuit 51. The image storage file is temporarily stored in the memory 56 (step 72). Further, the attendant file storage FD 6 is mounted on the attendant file reading circuit 53 in the image synthesizer 9. The attendant file stored in the attendant file storage FD 6 is read by the attendant file reading circuit 53, and is temporarily stored in the memory 56 (step 73).

The image storage file, the attendant file, and the template file which are temporarily stored in the memory 56 are inputted to the CPU 55. In the CPU 55, using the seat code stored in the image storage file, the image data linked to the seat code and attendant related information specified by the seat code and stored in the attendant file are read out. The image of the attendant which is represented by the image data and corresponding attendant related information are synthesized with the template image previously determined or selected in the template file such that the image of the attendant is synthesized with the image display area A3 of the template image, and the attendant related information are respectively synthesized in the other areas A1, A2, A4, A5, and A6 (step 74).

Image data representing a composite image is fed to the SCSI controller 57 from the CPU 55, and is inputted to the printer 61 (step 75). In the printer 61 (or the printers 62 to 64), the composite image is subjected to printing processing, so that the composite image is printed as illustrated in FIGS. 9 and 10 (step 76). The processing at the steps 72 to 76 is repeated until the printing processing is terminated with respect to all the attendants (step 77).

On the composite image printed as illustrated in FIGS. 9 and 10, the name of the attendant, together with the image of the attendant appears. Accordingly, the attendant to whom a print obtained by printing the composite image is to be handed is immediately found. A message which differs from attendant to attendant can be synthesized with the composite image, so that the message inherent in the attendant can be also displayed on the print.

An image synthesizing technique is disclosed in JP-A-9269999 (U.S. application Ser. No. 08/736,727) where an object image is synthesized with a template image at a predetermined position using a mask image. Further a synthesizing of a character (a letter) on an image can be realized by superimposing a bit map image (dot image) representing a character on a template image or synthesizing the character image with a template image using a mask image.

Identification data (ID) inherent in the digital camera used in photographing may be recorded on the image storage file, to print the identification data on the composite image. It is possible to know which digital camera is used to photograph the attendant by seeing the identification data printed on the composite image. When all printed composite images are handed to particular persons (the bridegroom, the bride, and others), the identification data is referred to, to find the person to whom each of the composite images is to be handed.

Figure 11:
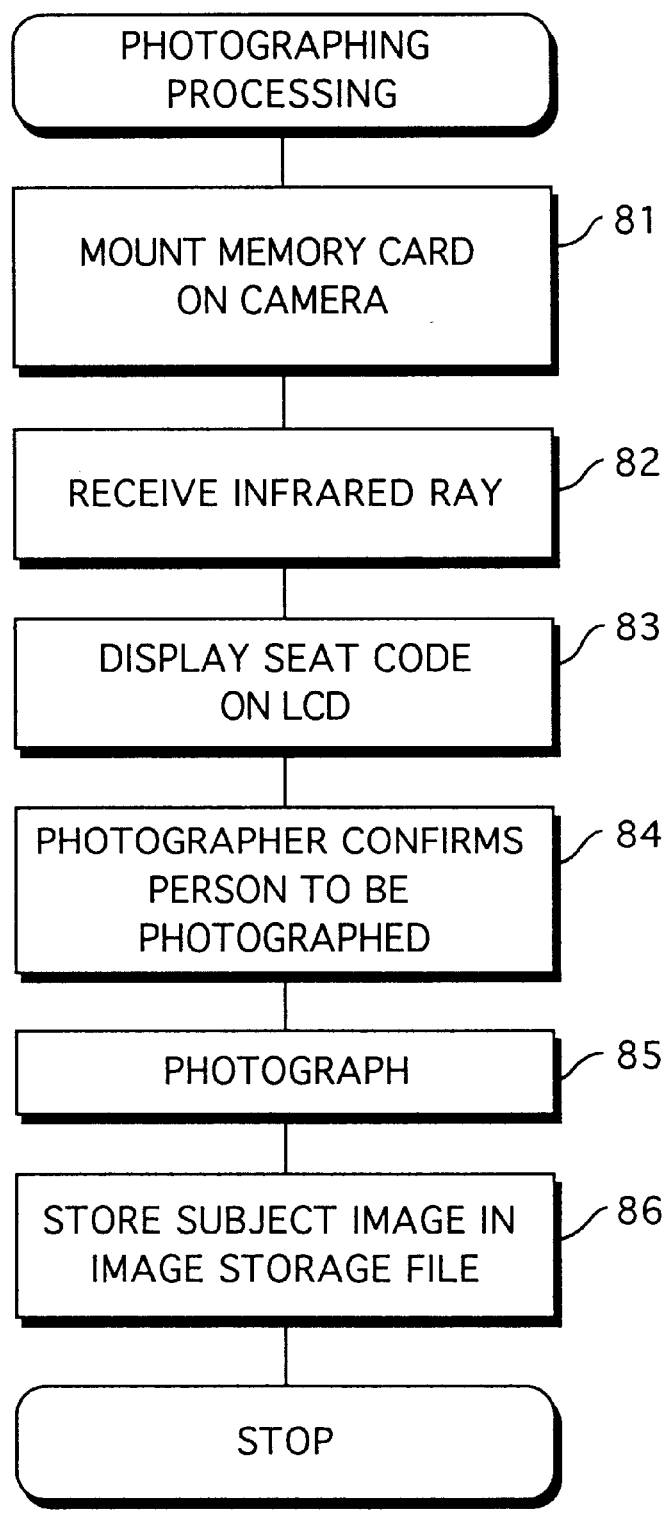
FIG. 11 is a flow chart showing the procedure for photographing processing.
Figure 12:
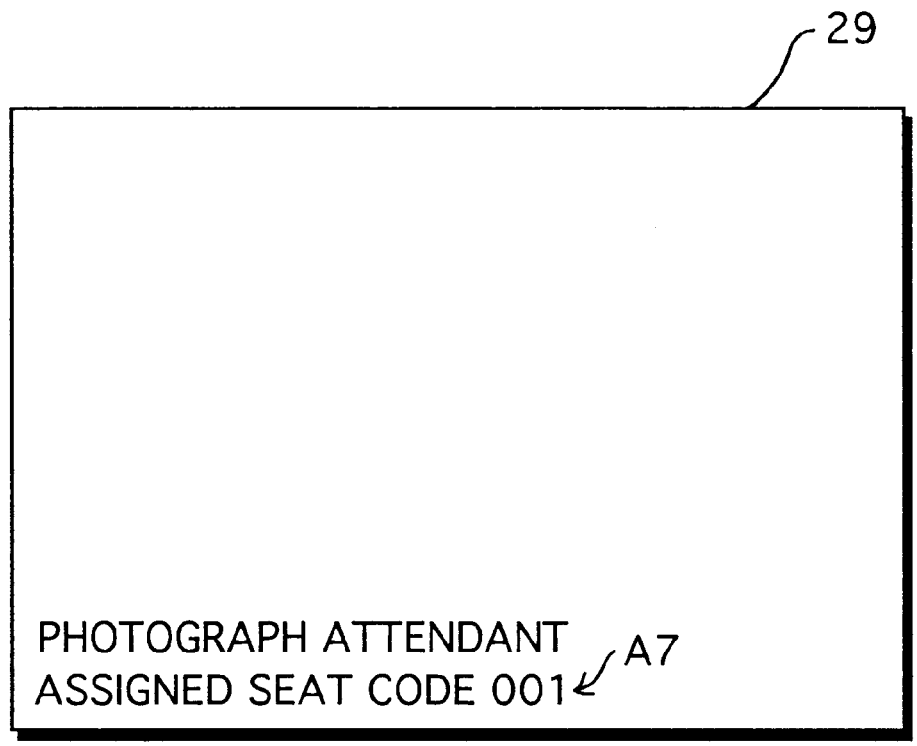
FIG. 12 illustrates an example of a display screen of a liquid crystal display device in a digital camera.

FIG. 11 is a flow chart showing the procedure of processing for photographing the attendant using the digital camera 1. FIG. 12 illustrates an example of a display screen of the liquid crystal display device 29 provided in the digital camera 1.

The memory card 5 is mounted on the digital camera 1 (step 81). A photographer direct the digital camera 1 to the attendant to be photographed. The infrared ray emitted from the Ir light emitting device 3 which is located in front of the attendant to be photographed is received by the Ir light receiving element 31 (Since at least one of the Ir light emitting device 3 and the Ir light receiving element 31 is of a structure having high directivity, the Ir light receiving element 31 can receive only the infrared ray emitted from the Ir light emitting device 3 to which the digital camera 1 is directed) (step 82). In a case where the digital camera has a function of zooming, the area or angle of receiving the infrared ray in the Ir light receiving element 31 may be varied (defined) in accordance with the zoom ratio.

The seat code assigned to the attendant and represented by the infrared ray received by the Ir light receiving element 31 of the digital camera 1 is displayed on an area A7 of the display screen of the liquid crystal display device 29 in the digital camera 1 (see FIG. 12) (step 83). A photographer confirms an attendant who is sitting in a seat designated by the seat code displayed on the display screen of the liquid crystal display device 29 (step 84), to photograph the attendant (step 85).

Image data obtained by the photographing is stored in the image data recording area of the image storage file in the memory card 5 (step 86). The seat code of the attendant represented by the received infrared ray is stored in the seat code recording area of the image storage file in the memory card 5 such that the seat code is linked to the corresponding image data representing the attendant.

In a case where the attendant is not in the seat when an attempt to photograph the attendant is made, the photographing will be continued without the attendant. Data indicating that the attendant has not been photographed yet is inputted by the operation key 47. The seat code of the attendant who has not been photographed is recorded in the image data recording area of the image storage file on the basis of the received infrared ray in response to the input from the operation key 47. The seat code is read out from the image data recording area to be displayed when the operation key 47 is operated, the attendant having the read seat code is photographed.

Furthermore, although in the above-mentioned embodiment, the seat code assigned to the attendant is displayed on the liquid crystal display device 29, not the seat code but the name of the attendant may be displayed. In this case, the data representing the name of the attendant is previously stored in the memory card 5 in correlation to the seat code of the attendant. when the infrared ray is received and the seat code represented by the infrared ray is recognized, the name data corresponding to the recognized seat code is read out from the memory card to be displayed. The image data obtained by photographing the attendance is stored in the memory card 5 in correlation with the seat code and the name data.

The attendant related information other than the name data may be previously stored in the memory card 5. That is, the attendant file may be stored in the memory card 5. Further the template images may also be stored in the memory card 5 in advance. In such a case, it is sufficient to connect (load or mount) only the memory card 5 to (on) the image synthesizer 8. All the data necessary to synthesize images and characters (message, name, data and so on) are read out from the memory card 5. In a case where the digital camera 1 has a function of image synthesizing and a printer provided thereon, the image synthesizing processing can be performed in the digital camera 1 using the image data (inclusive of the template image data) and the character data (attendant related information) which are read out of the memory card 5 and the synthesized image is printed in the digital camera 1.

According to the above-mentioned embodiment, the Ir light emitting device 3 is placed in front of the seat for the attendant, and the seat code represented by the infrared ray outputted from the Ir light emitting device 3 is used in order to relate the image obtained by the photographing and the attendant related information stored in the attendant file to each other. Even if the Ir light emitting device 3 is not used, however, the image obtained by the photographing and the attendant related information can be related to each other.

For example, the seat codes are previously stored in the memory card 5. A plate indicating the seat code (seat number) is placed or stood on the table 2 in front of the attendant. The seat code is read out from the memory card for each photographing automatically or in response to an input from the operation key 47 to be displayed on the display device 29 of the digital camera 1. The photographer shoots the attendant corresponding to the plate upon confirming the coincidence between the displayed seat code (number) and the seat code (number) indicated by the plate. The image data representing the image of the attendant which is obtained by the shooting is stored in the memory card 5 in correlation with the seat code. If the photographer memorized the seat code of the table in his or her head, the plate is not needed. Attendants are photographed in accordance with the order in which the seat codes are stored and read out from the memory card 5.

In recent years, a system for transmitting an image file to a laboratory from a user through a network and printing an image represented by the received image file in the laboratory has been constructed. Even in the system, identification data for identifying an image (for example, the name of a user that is an orderer) may be stored in the image file to be transmitted to the laboratory and printed on the image. By seeing the printed identification data, the laboratory can immediately confirm the orderer who has come for prints because it recognizes the orderer at a glance.

(2) Second Embodiment

A second embodiment is to produce one composite image using a plurality of frames of images. In the present embodiment, a composite image representing a story or summary of a wedding reception is produced using respective one images in scenes such as a scene of entrance of the bride and bridegroom, a scene of cake cutting, and a scene of the bride's change of dresses.

Figure 13:
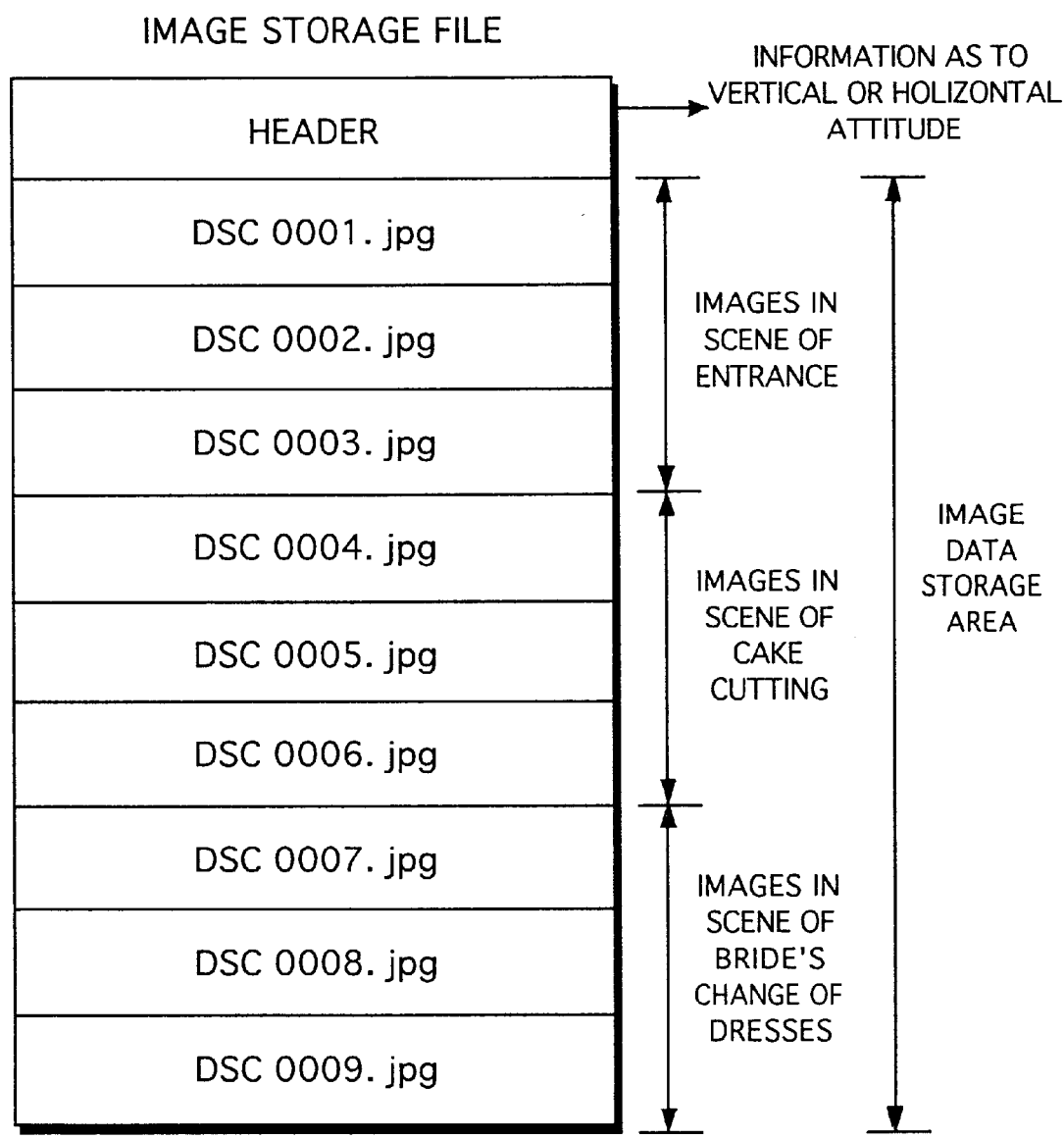
FIG. 13 illustrates an example of the contents of the image storage file.
Figure 14:
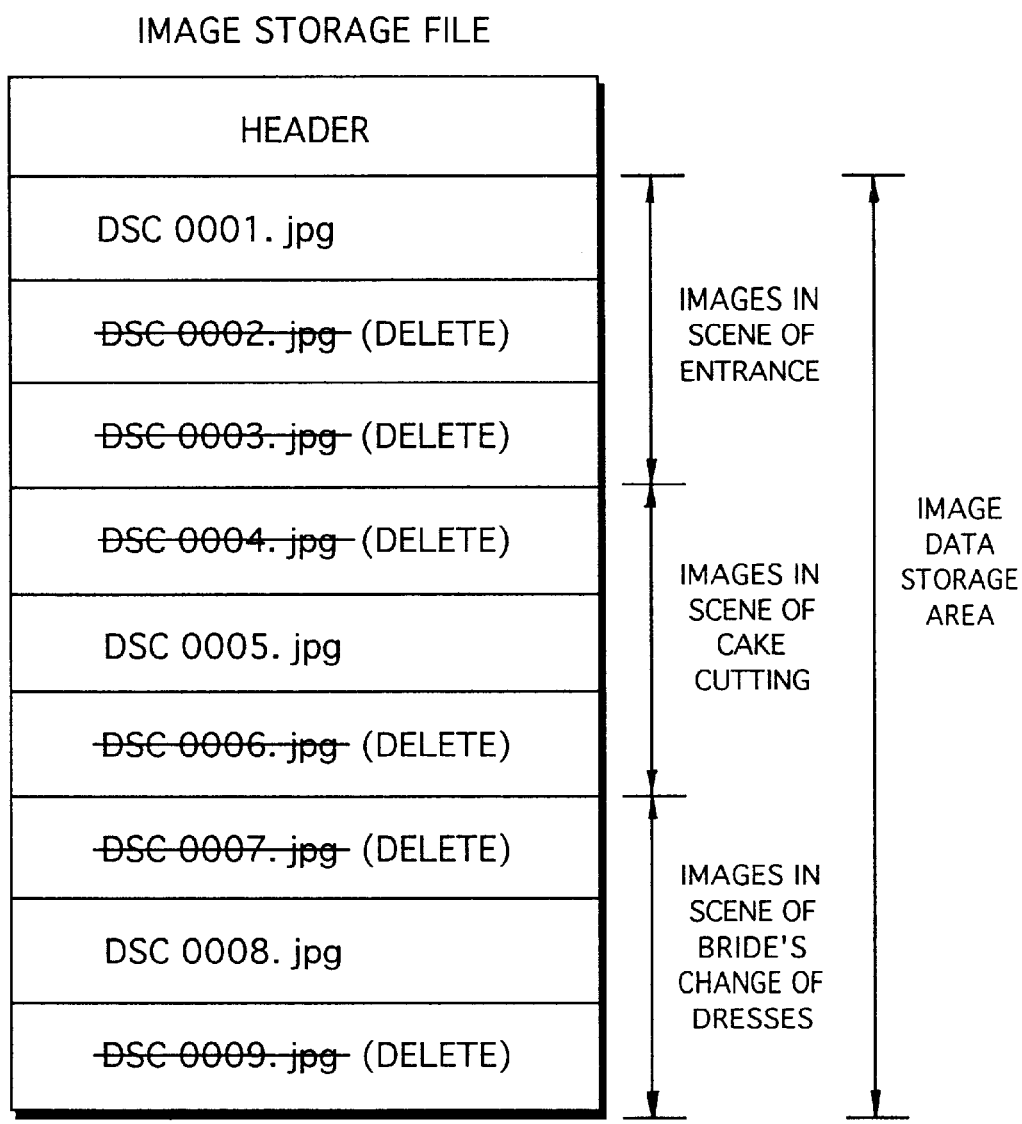
FIG. 14 illustrates an example of the contents of the image storage file.
Figure 15:
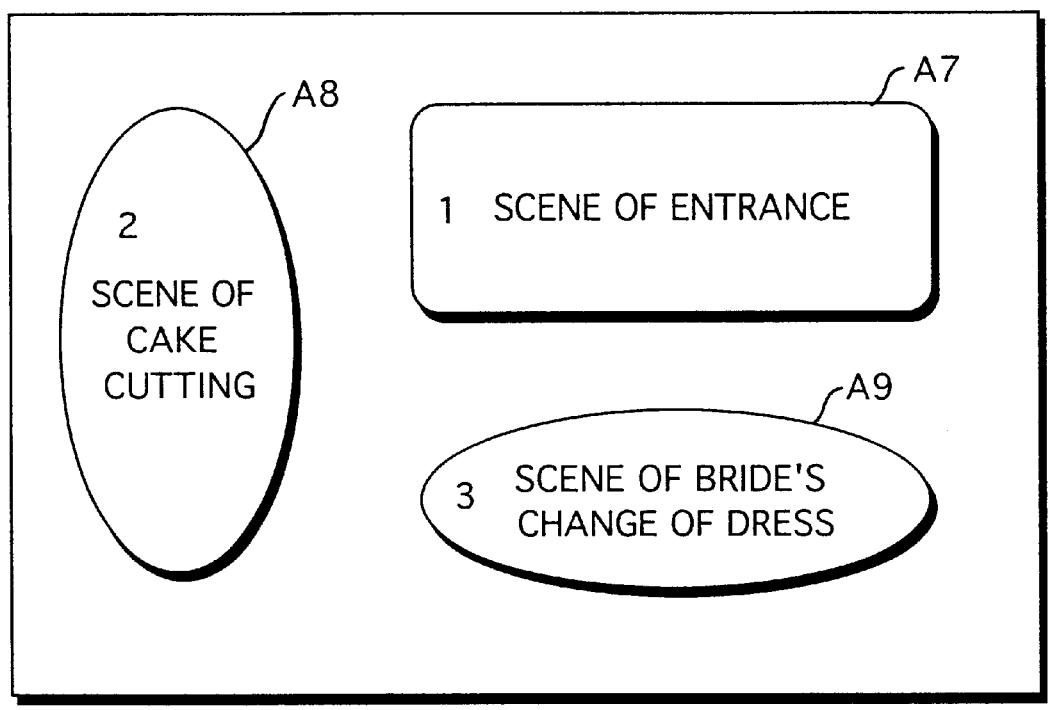
FIG. 15 illustrates an example of the template image format.
Figure 16:
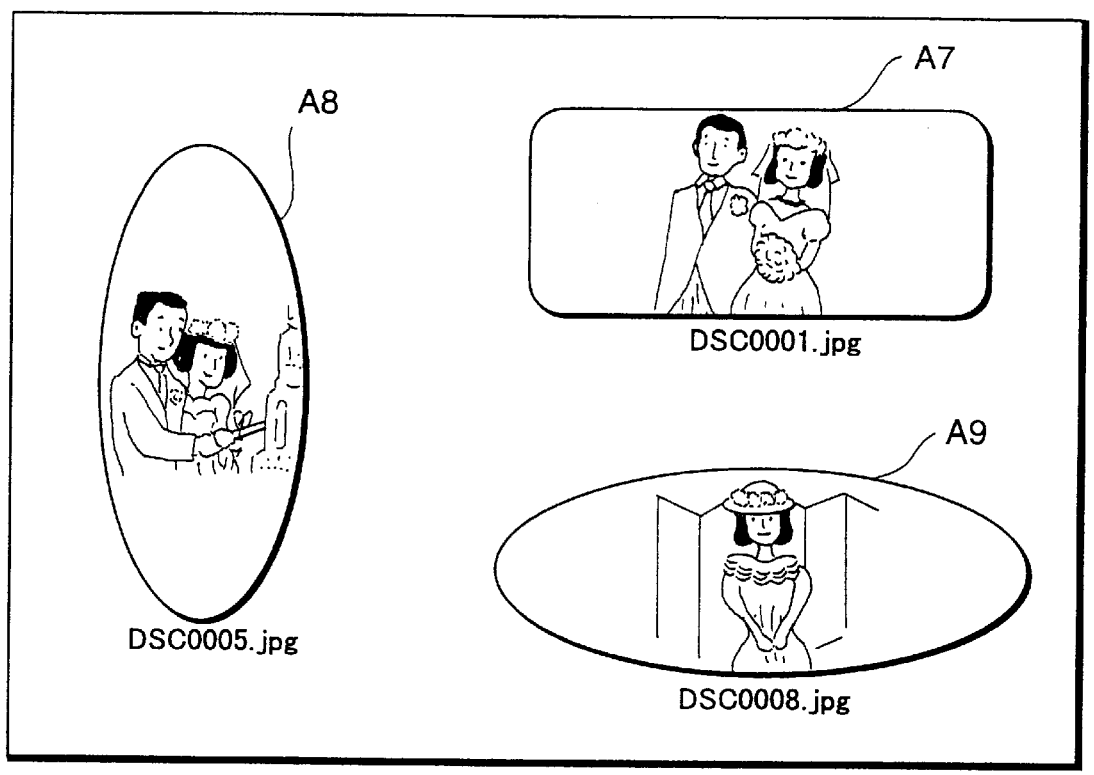
FIG. 16 illustrates an example of a print from a composite image.

FIGS. 13 and 14 respectively illustrate a format of an image storage file. FIG. 15 illustrates an example of a template image, and FIG. 16 illustrates an example of a produced composite image.

In FIG. 13, by photographing the bride and bridegroom using a digital camera 1, image data representing a lot of frames of images of the bride and bridegroom are stored in an image data storage area of the image storage file in a memory card 5. A plurality of frames of images of the bride and bridegroom are picked up for each of the scenes. For example, in the scene of entrance, three frames of images are picked up, and image data representing the images having IDs of DSC0001.jpg to DSC0003.jpg are stored in the image storage file. Also in the scene of cake cutting and the scene of the bride's change of dresses, three frames of images are picked up, and image data representing the images having IDs of DSC0004.jpg to DSC0006.jpg and the images DSC0007.jpg to DSC0009.jpg are stored in the image storage file.

A header area of the image storage file includes information indicating a vertical attitude or a horizontal attitude which is related to each of frames of images recorded in the image data recording area (the information indicating a vertical attitude or a horizontal attitude shows the attitude of the digital camera picking up a subject, which is inputted from the operation key 47 or set on the basis of an attitude detection output from an attitude detector (not shown)).

One frame of an image which is used for a synthesizing a composite image is determined for each of the scenes while each frame of an image is sequentially displayed on the display device 29 of the digital camera 1. Image data of images which are not used for synthesizing the composite image are deleted from the image storage file in response to an inputted delete command. FIG. 14 illustrates the image storage file from which the image data of the images which are not used for the composite image have been deleted. The image data DSC0001.jpg in the scene of entrance, the image data DSC0005.jpg in the scene of cake cutting and the image data DSC0008.jpg in the scene of the bride's change of dresses remain without being deleted as representatives of respective scenes in order to be used for synthesizing the composite image. The other image data are deleted from the image storage file.

FIG. 15 illustrates an example of a template image used for producing the composite image.

In the template image, a first synthesis area A7, a second synthesis area A8 and a third synthesis area A9 are predetermined. Images represented by image data stored in the image storage file are respectively synthesized with the first synthesis area A7, the second synthesis area A8 and the third synthesis area A9 in this order. The representative image in the scene of entrance is synthesized with the first synthesis area A7, the representative image in the scene of cake cutting is synthesized with the second synthesis area A8, and the representative image in the scene of the bride's change of dresses is synthesized with the third synthesis area A9.

FIG. 16 illustrates a composite image obtained by respectively synthesizing the images with the synthesis areas.

The image to be synthesized for each frame has already been determined in each of the scenes. The representative images of the scenes are synthesized with the synthesis areas of the template image in accordance with the order in which they are stored in the image storage file. The image DSC0001.jpg representing the scene of entrance is synthesized with the first synthesis area A7, the image DSC0005.jpg representing the scene of cake cutting is synthesized with the second synthesis area A8, and the image DSC0008.jpg representing the scene of the bride's change of dresses is synthesized with the third synthesis area A9. As explained in the first embodiment, a name of a person whom the composite image print is to be handed to may be synthesized in the composite image.

Figure 17:
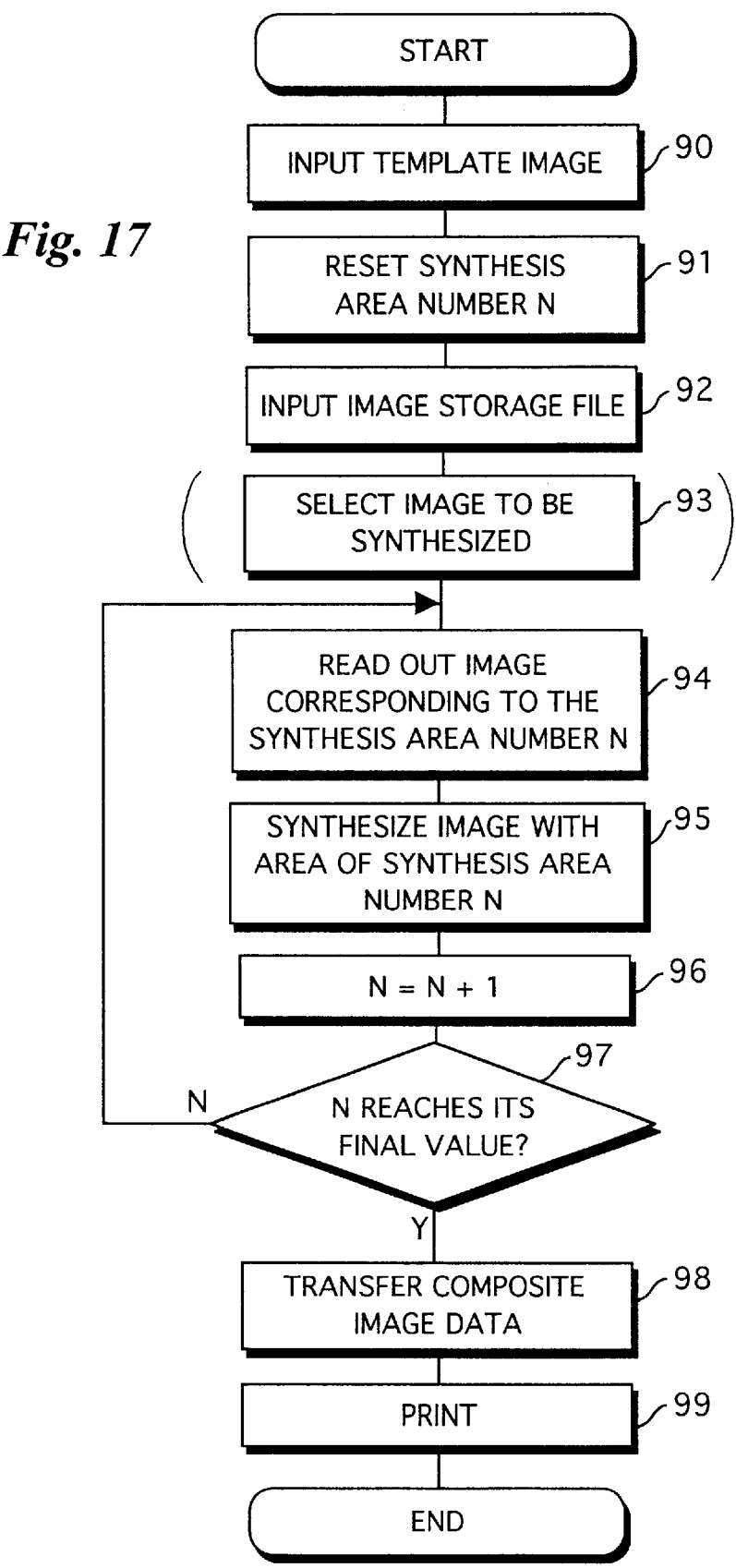
FIG. 17 is a flow chart showing the procedure for image synthesis processing.

FIG. 17 is a flow chart showing the procedure for composite image production processing. It is possible to use as an image synthesizer one shown in FIG. 7.

A template storage file FD 7 is mounted on an image synthesizer 9, so that a template file stored in the template file storage FD 7 is read (step 90). Image data representing a template image including a plurality of synthesis areas as shown in FIG. 15 is temporarily stored in a memory 56. A synthesis area number N representing the order in which images are synthesized with the synthesis areas is reset (step 91).

A memory card 5 having representative image data for respective scene recorded thereon is mounted on the image synthesizer 9, so that an image storage file stored in the memory card 5 is read (step 92). The read image storage file is temporarily stored in the memory 56. In the image storage file temporarily stored in the memory 56, images which are to be synthesized with the template image have already been selected (step 93), and image data representing unnecessary images have been deleted. Of course, when the memory card 5 has image data of images including images which are not used for image synthesizing, the image to be synthesized with the template image may be selected by transferring the image data of all the images in the image storage file to the memory 56 to store therein, then reading out the image data representing the images from the memory 56, and displaying the images on a monitor display device sequentially (or reduced images in lump) (step 93).

The template image data temporarily stored in the memory 56 is read out, and is inputted to the CPU 55. Thereafter, image data which is to be synthesized in the synthesis area of a synthesis area number N is read out of the memory 56, and is inputted to the CPU 55 (step 94). An image represented by the image data corresponding to the synthesis area number N is synthesized with the N-th synthesis area in the template image (step 95). As described above, the image storage file has information indicating a vertical or horizontal attitude of each of the images included in its header. It goes without saying that referring to this information, the images are respectively synthesized with the synthesis areas such that the arrangement is easy to see (the attitudes of images in the synthesis areas are the same as the attitudes of the digital camera when the images are picked up).

The synthesis area number N is incremented (step 96), and the processing at the steps 94 to 96 is repeated until the synthesis area number N reaches its final value (step 97). When the synthesis area number N reaches its final value (3 in FIG. 15) (YES at step 97), image data representing a composite image is fed to a printer 61 through an SCSI controller 57 from a CPU 55 (step 98). In the printer 61, processing for printing the composite image is performed (step 99).

The composite image representing a story or summary of the wedding reception is obtained.

(3) Third Embodiment

Figure 18:
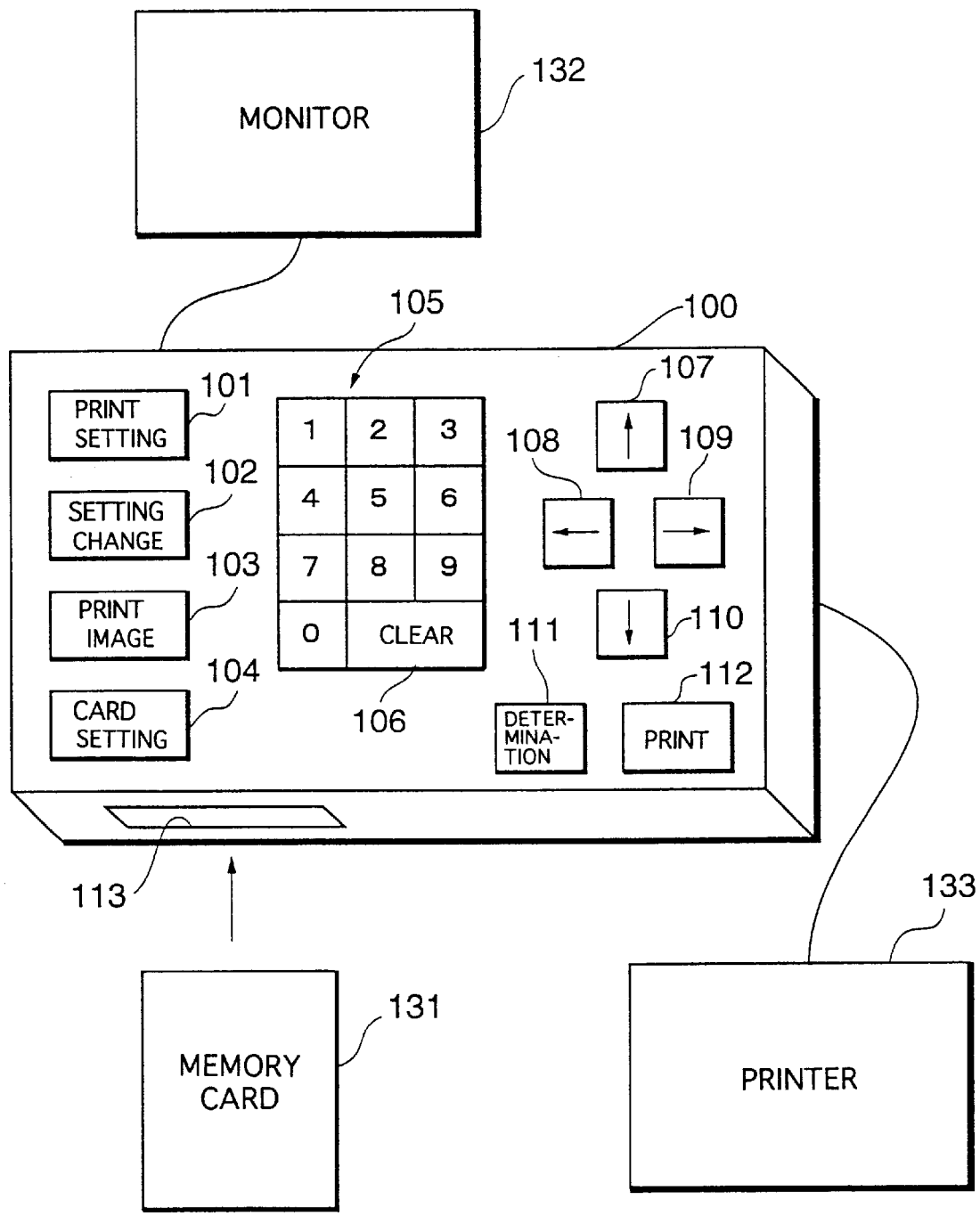
FIG. 18 illustrates whole construction of an image printing system.

FIG. 18 illustrates a third embodiment, which illustrates the configuration of an image printing system. The image printing system has functions of setting a number of photographs to be taken in a digital camera, setting a number of prints to be made and making prints of set number.

At a wedding reception, for example, the number of persons who sit for each table is previously determined. In the third embodiment, the number of photographs to be taken corresponding to the number of persons is previously determined for each table, and the number of photographs to be taken is displayed on the digital camera. The photographer judges that all attendants have not been photographed yet if the photographs whose number is previously determined have not been taken. It is possible to prevent the photographer from forgetting to photograph some of the attendants.

A monitor display device 132 and a printer 133 are connected to a printer controller 100. A memory card mounting port 113 is formed in the printer controller 100. A memory card 131 can be mounted on the memory card mounting port 113 to be connected. It is possible to display on the monitor display device 132 an image represented by image data recorded on the memory card 131 or print the image using the printer 133.

Provided on an operation surface (a surface shown in FIG. 18) of the printer controller 100 are a print setting button 101, a setting change button 102, a print image button 103, a card setting button 104, a ten-key pad 105, a clear button 106, a "↑ (upward arrow)" button 107, a "↓ (downward arrow)" button 108, a "← (leftward arrow)" button 109, a "→ (rightward arrow)" button 110, a determination button 111, and a print button 112.

Figure 19:
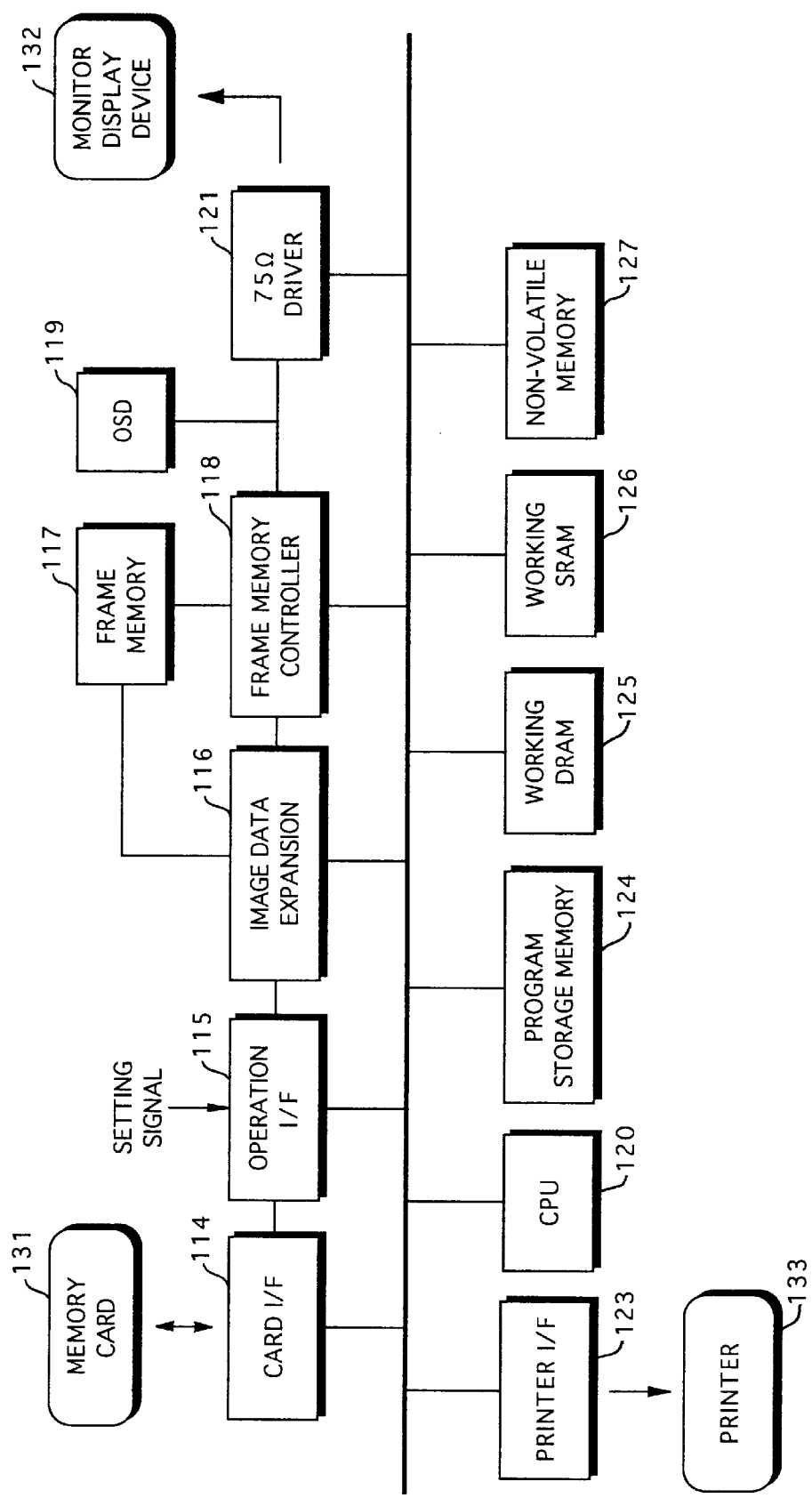
FIG. 19 is a block diagram showing the electrical configuration of a printer controller.

FIG. 19 is a block diagram showing the electrical configuration of the printer controller 100.

The overall operation of the printer controller 100 is supervised by a CPU 120.

The image data and the other data recorded on the memory card 131 mounted on and connected to the printer controller 100 are fetched into the printer controller 100 through a card interface 114. Input signals (setting signals) of various buttons which are provided on the operation surface, as described above, are fetched into the printer controller 100 through an operation interface 115.

The printer controller 100 comprises an image data expansion circuit 116, and compressed image data (e.g., compressed image data read out of the memory card 131) is expanded in the image data expansion circuit 116. The expanded image data is stored in a frame memory 117 under control of a memory controller 118. The image data temporarily stored in the frame memory 117 is read out of the frame memory 117 under control of the memory controller 118, and is fed to a monitor display device 132 through a 75-ohm driver 121. An image represented by the image data recorded on the memory card 131 is displayed on a display screen of the monitor display device 132.

The printer controller 100 also comprises an OSD (On Screen Device) circuit 119. Data representing characters to be displayed upon being superimposed on or synthesized with an image is outputted from the OSD circuit 119, and is fed to the monitor display device 132 through the 75-ohm driver 121. The image on which the characters have been superimposed is displayed on the display screen of the monitor display device 132.

The printer controller 100 comprises a printer interface 123, and a printer 133 is connected thereto through the printer interface 123.

Furthermore, the printer controller 100 comprises a program storage memory 124 storing an execution program, a working DRAM 125, a working SRAM 126, and a non-volatile memory 127.

Figure 20A:
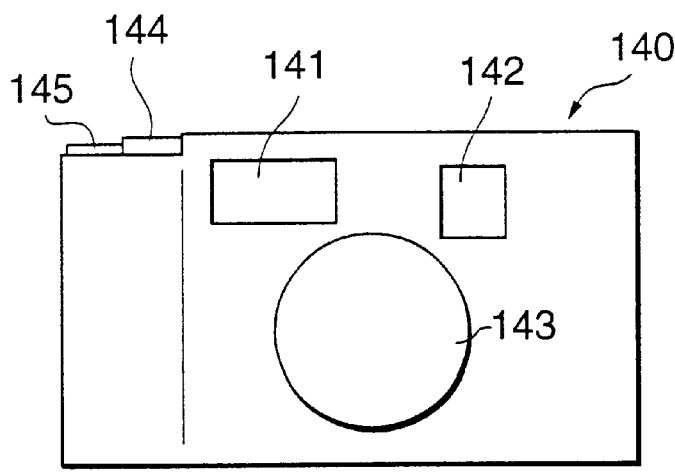
FIG. 20a is a front view of the digital camera.
Figure 20B:
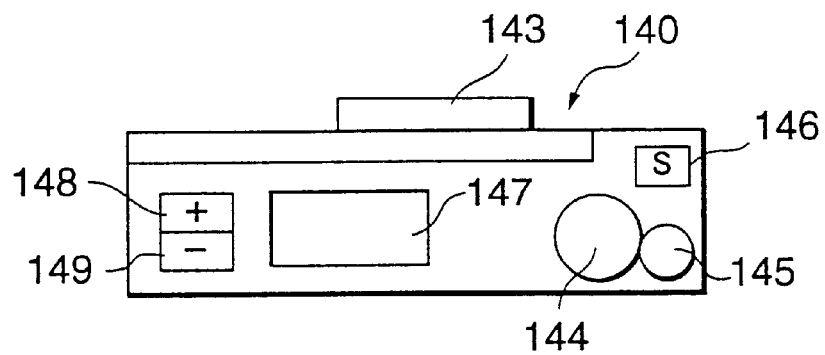
FIG. 20b is a plan view of the digital camera.
Figure 20C:
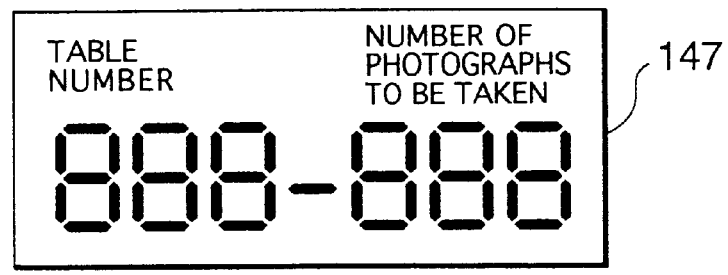
FIG. 20c illustrates an example of the display screen of the liquid crystal display device in the digital camera.

FIG. 20a is a front view of a digital camera, FIG. 20b is a plan view of the digital camera, and FIG. 20c illustrates an example of a screen of a liquid crystal display device provided in the digital camera.

An imaging lens 143 is arranged near the center of a front surface of a digital camera 140. A viewfinder 141 is formed at the upper left of the imaging lens 143 as viewed from the front. A strobe light emission device 142 is provided at the upper right of the imaging lens 143 as viewed from the front.

In FIG. 20b, a shutter release switch 146 and a first dial 144 and a second dial 145 are provided at the right of a plane of the digital camera 140. The first dial 144 is an imaging mode setting dial (for setting an imaging mode and so on), and the second dial 145 is a dial for incrementing or decrementing a table number or the like, as described later.

A liquid crystal display device 147 is provided near the center of the plane of the digital camera 140. An up-key 148 and a down-key 149 are arranged at the left of the liquid crystal display device 147.

A table number and the number of photographs to be taken are displayed on a display screen of the liquid crystal display device 147.

Further the digital camera 140 is provided on the back surface thereof with an image display device for displaying a picked-up subject image and a display device for displaying a number of photographs which have been taken and a remaining number of photographs to be taken in the same table.

Figure 21:
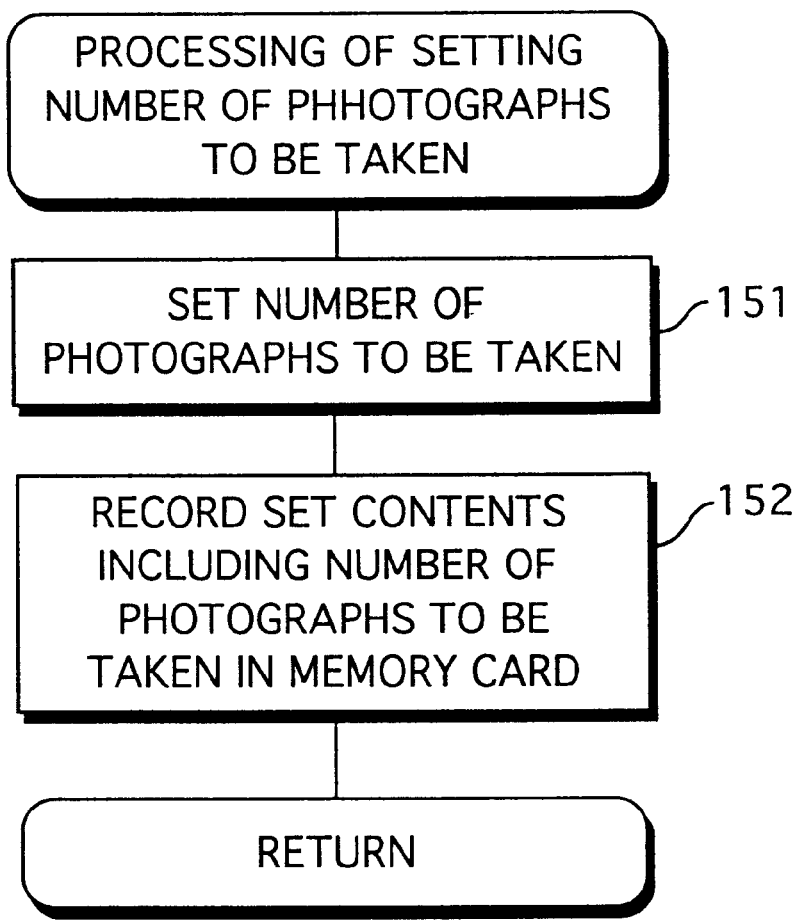
FIG. 21 is a flow chart showing the procedure for processing of setting a number of photographs to be taken.

FIG. 21 is a flow chart showing the procedure for processing of setting the number of photographs to be taken in the printer controller 100. FIG. 22 illustrates an example of the display screen of the monitor display device 132. FIG. 23 illustrates a table of the number of photographs to be taken which are recorded on a memory card.

Also in the present embodiment, description is made of a case where attendants are photographed at a wedding reception.

Recorded in correlation with the table number in the table of the number of photographs to be taken are the number of photographs to be taken of the attendants who sit around the table and the remaining number of photographs which is calculated by subtracting the number of photographs having been actually taken from the number of photographs to be taken.

First, processing for setting the number of photographs to be taken is performed in the printer controller 100 (step 151). In the processing for setting the number of photographs to be taken, the number of photographs to be taken for each table is set. In the processing for setting the number of photographs to be taken, a screen for setting the number of photographs to be taken, shown in FIG. 22, appears on the display screen of the monitor display device 132.

The number of photographs to be taken for each table is set while seeing the screen for setting in the following manner. A table number and the number of photographs to be taken are entered using the ten-key pad 105. The table number is displayed in an area A11. The number of photographs to be taken is displayed in an area A12. Table numbers each corresponding to the number of photographs to be taken which has already been set are displayed in an area A13. The number of photographs to be taken which has already been set is displayed for each of the table numbers in an area A14. The display areas A13 and A14 where the table numbers and the numbers of photographs to be taken for the table numbers are respectively displayed are scrolled by pushing the "↑" button 107 or the "↓" button 110.

A table number is first set. A table number to be set is entered using the ten-key pad 105. The entered table number is displayed by italics. Entry of a desired figure is set using the "←" button 108 or the "→" button 109. When the table number is entered, the determination button 111 is pushed.

The number of photographs to be taken at the table having the set table number is then entered. The number of photographs to be taken is set to the same number as the number of attendants who sit at the table specified by the table number. When the number of photographs to be taken is entered, the determination button 111 is pushed.

When the number of photographs to be taken is set, the memory card 131 is mounted on (connected to) the printer controller 100 (the memory card may be mounted in advance), and data including the set number of photographs to be taken is recorded on the memory card 131 (step 152).

The memory card 131 is taken out of the printer controller 100, and is mounted on (connected to) the digital camera 140. The number of photographs to be taken for each table number which are recorded on the memory card 131 is read out of the memory card 131. A pair of the table number and the number of photographs to be taken is displayed on the liquid crystal display device 147 in the digital camera 140. A photographer can know the number of photographs to be taken at each table by seeing the table number and the number of photographs to be taken at the table having the table number which are displayed on the liquid crystal display device 147. The attendants are photographed while the photographer sees the number of photographs to be taken for each table which is displayed on the liquid crystal display device 147. It is possible to prevent the photographer from forgetting to photograph some of the attendants. The image data obtained by the photographing is stored in the memory card 131 in correlation with the table number.

Specifically, the dial 144 provided in the digital camera 140 is turned by the photographer, so that an imaging mode is first set. Thereafter, when the dial 145 is turned by the photographer, the data representing the number of photographs to be taken for each table number which is recorded on the memory card 131 is read out, and the table number and the number of photographs to be taken at the table having the table number are displayed on the liquid crystal display device 147 in the digital camera 140.

A desired pair of the table number and the number of photographs to be taken can be displayed by incrementing or decrementing the table number displayed on the display device 147 by the dial 145. The number of photographs which have been taken for each table is displayed on the display device provided on the back surface of the digital camera 140. When the photographer moves from one table to another table to take photographs, the number of photographs which have been taken is reset by pressing a reset switch (not shown) or when the dial 145 is rotated.

In the digital camera 140, the number of photographs to be taken can be changed. The table number corresponding to the number of photographs to be taken which should be changed is displayed on the liquid crystal display device 147. When the number of photographs to be taken is increased, the up-key 148 is pushed. The number of photographs to be taken is increased by pushing the up-key 148. The increased number of photographs to be taken is displayed on the liquid crystal display device 147, and the number of photographs to be taken which is recorded on the memory card 131 is changed. When the number of photographs to be taken is decreased, the down-key 149 is depressed. The number of photographs to be taken is decreased and displayed on the liquid crystal display device 147, and the number of photographs to be taken which is recorded on the memory card 131 is changed.

The number of photographs to be taken is increased when the number of attendants who sit at the table is increased, while being decreased when the number of attendants who sit at the table is decreased.

Generally, each of the attendants is photographed alone at each of the tables. The plurality of attendants may be photographed at a time. In the case, the number of photographs to be taken is decreased. When the attendant is photographed, the number of photographs which have been taken is subtracted from the number of photographs to be taken, and the remaining number of photographs to be taken is calculated for each table number. Data representing the calculated remaining number of photographs to be taken is recorded on the memory card 131 (see FIG. 23). The remaining number of photographs to be taken is displayed on the display device provided on the back surface of the digital camera.

When all the attendants have been photographed, the memory card 131 is taken out of the digital camera 140. Processing moves to a print processing in the print controller 100.

Figure 24:
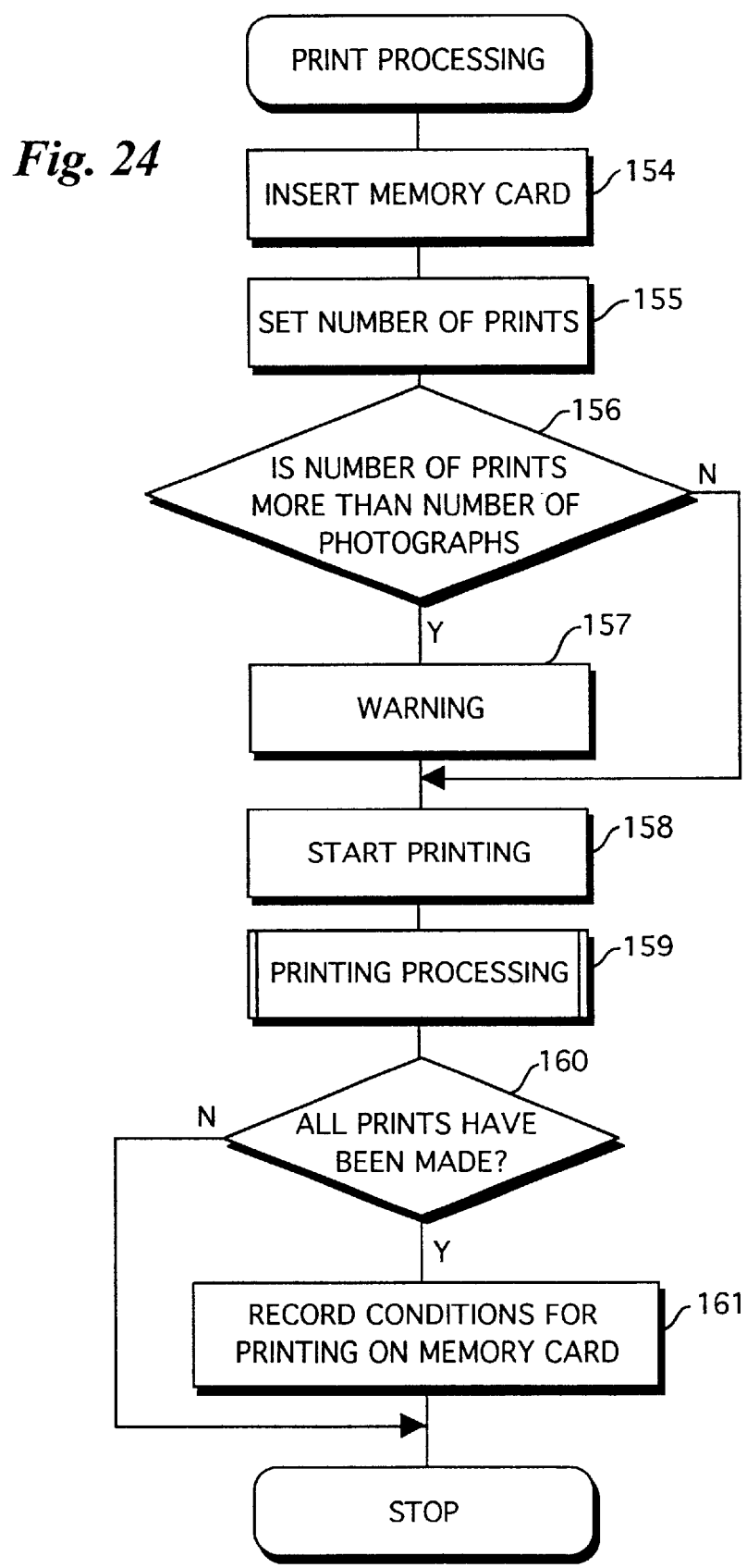
FIG. 24 is a flow chart showing the procedure for processing of printing in the print controller.

FIG. 24 is a flow chart showing a print processing in the print controller. FIGS. 25 and 26 illustrate examples of display screens of the monitor display device.

The memory card 131 is mounted on the printer controller 100 (step 154). Image data representing an image of the attendant which is recorded on the memory card 131 is read out, and is fed to the image data expansion circuit 116, where the image data is expanded. The expanded image data is inputted to the CPU 120, where the image of the attendant is reduced (data representing a reduced image which has been previously produced and recorded in the memory card 131 may be used). Image data representing the reduced image is outputted from the CPU 120, and is fed to the monitor display device 132 through the frame memory controller 118 and the 75-ohm driver 121. A list of reduced images (reduced images t1 to t9) of the images of the attendants is displayed, as shown in FIG. 25, on the display screen of the monitor display device 132.

Data representing the table number and data representing the number of photographs to be taken (and the number of photographs which have been taken) for the table number which are recorded on the memory card 131 are also read out, and are inputted to the monitor display device 132. The table number for the attendant is displayed on the reduced image which is displayed on the monitor display device 132. The number of prints to be made from the image of the attendant is also displayed on the reduced image. "1" is first displayed as the number of prints to be made. A user of the printer controller 100 sets the number of prints to be made from the image of the attendant using the ten-key pad 105 (step 155). When the attendants are separately photographed, the number of prints to be made will be set such that one print is made from each of the images of all the attendants. When the plurality of attendants are photographed at a time, the number of prints to be made will be set such that the prints whose number corresponds to the number of photographed attendants are made.

A mark 161 indicating that the number of prints to be made is being set is displayed on the reduced image which is subjected to the number-of-print setting. The table number and the number of prints to be made on the reduced image on which the mark 161 is displayed are displayed by italics. The reduced image on which the number of prints to be made is set is designated using the ten-key pad 105. When the number of prints to be made is set on the reduced image t1, "1" is entered using the ten-key pad 105. When the number of prints to be made is set on each of the other reduced images t2 to t9, a numerical value (2–9) (which may be a number corresponding to the table number) corresponding to the reduced image is also entered using the ten-key pad 105.

A figure for setting the number of prints to be made is moved rightward by pushing the "→" button 109, while being moved leftward by pushing the "←" button 108. When the entered number of prints to be made is confirmed, the determination button 111 is pushed by the user. The reduced image is scrolled upward by pushing the "↑" button 107, while being scrolled downward by pushing the "↓" button 110.

It is checked whether the number of prints set for each table (sum of the number of prints set on the reduced images of attendants who sit at the same table) is more (exclusive of equal) than the number of photographs to be taken (or number of photographs which have been taken) previously set for each table number (step 156). If the number of prints is more than the number of photographs (YES at step 156), excessive prints may be made, so that a warning is displayed on the monitor display device 132 (step 157). When the number of prints is equal to or less than the number of photographs to be taken (or having been taken) (NO at 156), the processing of step 157 is skipped. The warning may be displayed even when the set number of prints is less than the number of photographs to be taken (or having been taken).

When the setting of the number of prints has been completed, the image data representing the image of the attendant which is recorded on the memory card 131 is transmitted to the printer 133. Consequently, the printing processing of the image of the attendant is started (step 158). Data representing the set number of prints to be made is also transmitted to the printer 133, so that prints whose number corresponds to the number of prints to be made are made from the image of the attendant (step 159).

Conditions for printing in the printer 133 are displayed on the monitor display device 132. FIG. 26 shows a printing condition screen.

The printing condition screen includes an area A31 where the number of all prints to be made is displayed and an area A32 where the number of prints which have been made is displayed. Further, it includes an area A32 where a table number is displayed, an area A33 where the number of prints to be made for each table is displayed, and an area A34 where the number of prints which have been made for each table is displayed. The number of prints to be made and the number of prints which have been made are displayed for each table number.

The display in the areas A33 to A35 is scrolled by pushing the "↑" button 107 and the "↓" button 110.

Unless all the prints (of all the number of prints to be made) have been made irrespective of the termination of the printing processing by the printer 133 (for example, in a case where the printing processing is interrupted) (step 160), data representing the conditions for printing is recorded on the memory card 131 (step 161). The memory card 131 is taken out of the printer controller 100, and the attendant is photographed using the digital camera 140. When the photographing is terminated, a printing operation of the image of the attendant will be continued again. When all the prints have been made (step 160), the processing of step 161 is skipped.

Figure 27:
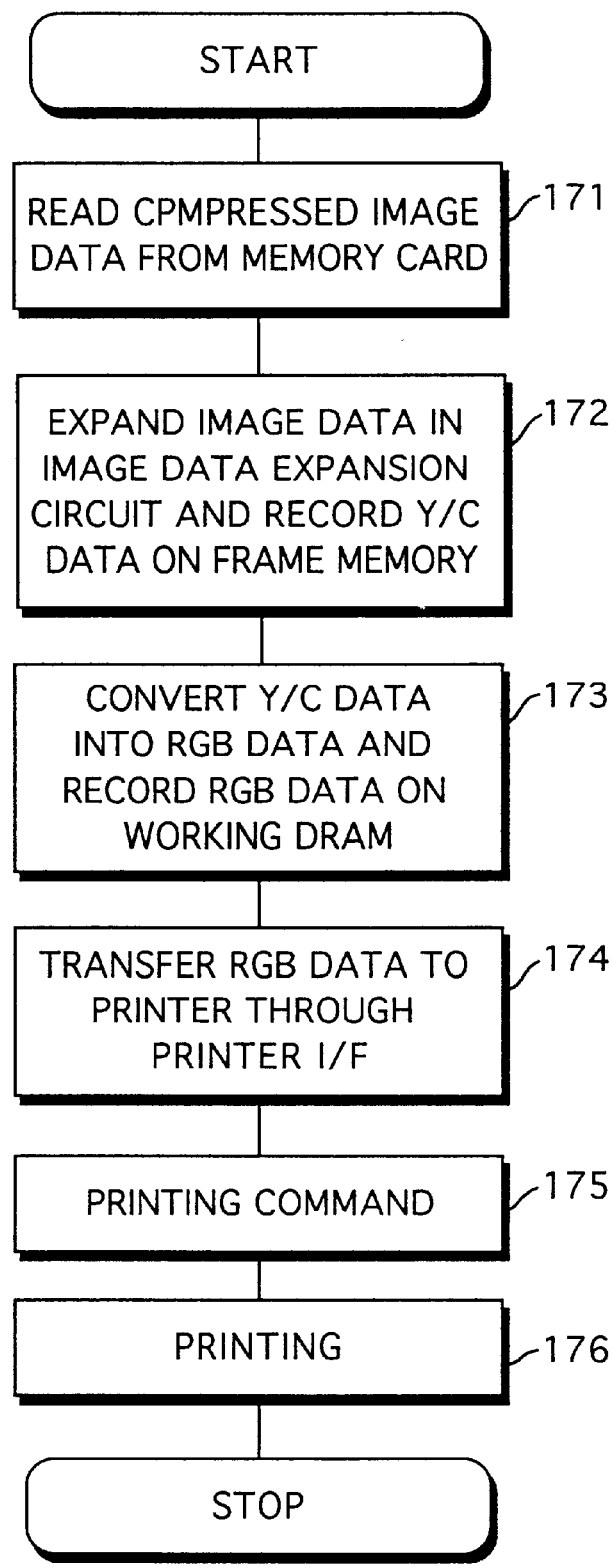
FIG. 27 is a flow chart showing the procedure for printing processing.

FIG. 27 is a flow chart showing the procedure for the printing processing (processing of step 159 in FIG. 24).

Compressed image data recorded on the memory card 131 is read out (step 171). The image data read out is expanded to luminance data Y and color difference data C in the data expansion circuit 116, as described above, and the luminance data Y and the color difference data C are temporarily stored in the frame memory 117 (step 172).

The luminance data Y and the color difference data C are converted into RGB image data in the CPU 120, and the RGB image data is temporarily stored in the working DRAM 125 (step 173). The RGB image data is read out of the working DRAM 125, and is fed to the printer 133 through the printer interface 123 (step 174).

A printing command is given to the printer 133 (step 175), and printing processing is performed by the printer 133.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image synthesizer comprising:

a first reading device for reading, from an image file storing image data of a plurality of frames respectively representing subject images which are obtained by photographing the subjects in correlation with identification codes respectively specifying the plurality of subjects, the image data and the identification codes;

a second reading device for reading, from a subject identification file storing subject identification information including the identification codes for the plurality of subjects, the subject identification information;

an output device for synthesizing to output the image data and the subject identification information which are related to each other by the identification code, among the image data obtained by the first reading device and the subject identification information obtained by the second reading device;

an input device for inputting template image data representing a template image in which a plurality of synthesis areas are defined, and the output device synthesizing the image data and data representing the subject identification information with the template image data fetched by the input device such that the subject image and the subject identification information are placed in the synthesis areas.

2. The image synthesizer according to claim 1, wherein the output device outputs a signal representing the image data and a signal representing the subject identification information.

3. The image synthesizer according to claim 1, wherein the output device performs image synthesis of the image data representing the subject and image data representing the subject identification information to output.

4. The image synthesizer according to claim 1, wherein the output device synthesizes the subject image represented by the image data and the subject identification information with a template image to output.

5. The image synthesizer according to claim 4, wherein the output device includes a printer printing the synthesized composite image.

6. The image synthesizer according to claim 1, wherein the first reading means reads the image data from a memory card which is loadable on and unloadable from a digital camera.

7. A method of controlling the operation of a digital camera, comprising the steps of:

inputting identification data determined in correspondence with a subject;

photographing the subject, to obtain image data representing an image of the subject;

recording the image data obtained by the photographing and the inputted identification data on a recording medium in correlation with each other;

registering identification codes of identification data for which image data have not been input; and receiving an identification code corresponding to a respective segment of the identification data when photographing the subject;

wherein said recording step correlates the respective segment of the identification data with the image data based on the received identification code; and wherein the respective segment comprises name information associated with the identification code.

8. An image synthesizer according to claim 1 wherein the identification information and the image data are individually and uniquely correlated.

9. The image synthesizer of claim 1, wherein the image file storing image data is stored to a first storage device which is read by the first reading device, and the subject identification file is stored to a second storage device which is read by the second reading device, wherein the first and second storage devices comprise separate media.

* * * * *